US012537091B2

(12) United States Patent
Ruiz et al.

(10) Patent No.: US 12,537,091 B2
(45) Date of Patent: Jan. 27, 2026

(54) SYSTEMS AND METHODS FOR AI-ASSISTED MEDICAL IMAGE ANNOTATION

(71) Applicant: Kaliber Labs Inc., San Francisco, CA (US)

(72) Inventors: Mark Ruiz, San Francisco, CA (US); Chandra Jonelagadda, San Francisco, CA (US); Ray Rahman, San Francisco, CA (US); Aneesh Jonelagadda, San Francisco, CA (US)

(73) Assignee: Kaliber Labs Inc., San Francisco, CA (US)

( * ) Notice: Subject to any disclaimer, the term of this patent is extended or adjusted under 35 U.S.C. 154(b) by 190 days.

(21) Appl. No.: 18/555,248

(22) PCT Filed: Apr. 12, 2022

(86) PCT No.: PCT/US2022/024504
§ 371 (c)(1),
(2) Date: Oct. 12, 2023

(87) PCT Pub. No.: WO2022/221342
PCT Pub. Date: Oct. 20, 2022

(65) Prior Publication Data
US 2024/0203567 A1 Jun. 20, 2024

Related U.S. Application Data

(60) Provisional application No. 63/173,935, filed on Apr. 12, 2021.

(51) Int. Cl.
G06V 20/70 (2022.01)
G06T 3/40 (2006.01)
(Continued)

(52) U.S. Cl.
CPC ............... *G16H 30/40* (2018.01); *G06T 3/40* (2013.01); *G06T 5/20* (2013.01); *G06T 7/20* (2013.01);
(Continued)

(58) Field of Classification Search
CPC .......... G16H 30/40; G06V 20/70; G06T 5/20; G06T 7/20
See application file for complete search history.

(56) References Cited

U.S. PATENT DOCUMENTS 4,600,005 A 7/1986 Hendel
5,215,095 A 6/1993 Macvicar et al.
(Continued)

FOREIGN PATENT DOCUMENTS

EP 2194836 B1 11/2015
JP 2002065585 A 3/2002
(Continued)

OTHER PUBLICATIONS

Jonelagadda et al.; U.S. Appl. No. 19/127,410 entitled "Apparatus and method for interactive three-dimensional surgical guidance," filed May 5, 2025.
(Continued)

Primary Examiner — Edward Park
(74) Attorney, Agent, or Firm — Shay Glenn LLP

(57) ABSTRACT

AI-based systems and methods to annotate images and video from a surgical procedure may include extracting feature points (FP) from a still image (SI) of the procedure and each frame of a group of frames (GOF) from a procedure video and comparing FPs of the SI to FPs of each frame of the GOF to determine a match between the SI and a given frame from the video and a location in the video where the match occurred. Then the portion of the video containing the matched image is copied to create a video clip (VC) having (Continued)

a selected duration. Frames in the VC are analyzed to identify image features (IF), where a fidelity of IF identification is substantially unaffected when the IF is non-localizable or obscured. Then the SI and/or VC is annotated with information from the procedure, the information including or derived from the IFs.

26 Claims, 22 Drawing Sheets

(51) Int. Cl.
G06T 5/20 (2006.01)
G06T 7/20 (2017.01)
G06V 10/44 (2022.01)
G06V 10/54 (2022.01)
G06V 10/74 (2022.01)
G16H 30/40 (2018.01)

(52) U.S. Cl.
CPC .............. *G06V 10/44* (2022.01); *G06V 10/54* (2022.01); *G06V 10/761* (2022.01); *G06V 20/70* (2022.01); *G06T 2207/10068* (2013.01); *G06V 2201/03* (2022.01)

(56) References Cited

U.S. PATENT DOCUMENTS

| | | | |
|---|---|---|---|
| 6,491,699 B1 | 12/2002 | Henderson et al. | |
| 8,860,757 B2 | 10/2014 | Duhamel et al. | |
| 9,075,899 B1 | 7/2015 | Reicher | |
| 10,130,429 B1 | 11/2018 | Weir | |
| 10,169,535 B2 | 1/2019 | Mentis | |
| 10,543,046 B2 | 1/2020 | Charron et al. | |
| 10,806,325 B2 | 10/2020 | Miller et al. | |
| 11,832,996 B2 | 12/2023 | Shelton et al. | |
| 2003/0181810 A1 | 9/2003 | Murphy et al. | |
| 2003/0195883 A1 | 10/2003 | Mojsilovic et al. | |
| 2004/0087852 A1 | 5/2004 | Chen | |
| 2004/0199404 A1 | 10/2004 | Ripperger et al. | |
| 2006/0058616 A1 | 3/2006 | Marquart et al. | |
| 2006/0258938 A1 | 11/2006 | Hoffman et al. | |
| 2007/0016009 A1 | 1/2007 | Lakin et al. | |
| 2007/0116036 A1 | 5/2007 | Moore | |
| 2007/0168461 A1 | 7/2007 | Moore | |
| 2009/0088897 A1 | 4/2009 | Zhao et al. | |
| 2009/0317002 A1 | 12/2009 | Dien | |
| 2011/0190774 A1 | 8/2011 | Nikolchev et al. | |
| 2011/0202370 A1 | 8/2011 | Green, III et al. | |
| 2011/0301447 A1 | 12/2011 | Park et al. | |
| 2012/0130258 A1 | 5/2012 | Taylor et al. | |
| 2012/0289782 A1 | 11/2012 | Viola | |
| 2013/0073310 A1 | 3/2013 | Awdeh | |
| 2013/0096373 A1 | 4/2013 | Chabanas et al. | |
| 2013/0211232 A1 | 8/2013 | Murphy et al. | |
| 2014/0058406 A1 | 2/2014 | Tsekos | |
| 2014/0149407 A1 | 5/2014 | Qian et al. | |
| 2014/0216966 A1 | 8/2014 | Ramkhelawan et al. | |
| 2014/0236159 A1 | 8/2014 | Haider et al. | |
| 2014/0267658 A1 | 9/2014 | Speier et al. | |
| 2015/0005622 A1 | 1/2015 | Zhao et al. | |
| 2015/0161802 A1 | 6/2015 | Christiansen | |
| 2015/0221105 A1 | 8/2015 | Tripathi et al. | |
| 2016/0000515 A1 | 1/2016 | Sela et al. | |
| 2016/0151117 A1 | 6/2016 | Gibbs et al. | |
| 2016/0270641 A1 | 9/2016 | Mirza et al. | |
| 2016/0378861 A1 | 12/2016 | Eledath et al. | |
| 2017/0007327 A1 | 1/2017 | Haider et al. | |
| 2017/0151022 A1 | 6/2017 | Jascob et al. | |
| 2017/0193160 A1 | 7/2017 | Long et al. | |
| 2018/0049622 A1 | 2/2018 | Ryan et al. | |
| 2018/0071032 A1 | 3/2018 | de Almeida Barreto | |
| 2018/0122506 A1 | 5/2018 | Grantcharov et al. | |
| 2018/0168740 A1 | 6/2018 | Ryan et al. | |
| 2018/0204111 A1* | 7/2018 | Zadeh | G06V 10/764 |
| 2018/0247128 A1 | 8/2018 | Alvi et al. | |
| 2018/0249888 A1 | 9/2018 | Kucharski et al. | |
| 2018/0366231 A1 | 12/2018 | Wolf et al. | |
| 2018/0368656 A1 | 12/2018 | Austin et al. | |
| 2019/0069957 A1 | 3/2019 | Barral et al. | |
| 2019/0192232 A1 | 6/2019 | Altmann et al. | |
| 2019/0209080 A1 | 7/2019 | Gullotti et al. | |
| 2019/0311493 A1 | 10/2019 | Hillborg | |
| 2019/0362834 A1 | 11/2019 | Venkataraman et al. | |
| 2019/0380792 A1 | 12/2019 | Poltaretskyi et al. | |
| 2019/0385302 A1 | 12/2019 | Ngo et al. | |
| 2020/0005949 A1 | 1/2020 | Warkentine | |
| 2020/0078123 A1 | 3/2020 | Venkataraman et al. | |
| 2020/0107002 A1 | 4/2020 | Casas | |
| 2020/0111564 A1 | 4/2020 | Mastros | |
| 2020/0197098 A1 | 6/2020 | Chopra et al. | |
| 2020/0210769 A1 | 7/2020 | Hou et al. | |
| 2020/0211720 A1 | 7/2020 | Goldberg | |
| 2020/0237452 A1 | 7/2020 | Wolf et al. | |
| 2020/0265273 A1 | 8/2020 | Wei et al. | |
| 2021/0059758 A1 | 3/2021 | Avendi et al. | |
| 2021/0128244 A1 | 5/2021 | Couture et al. | |
| 2021/0192759 A1 | 6/2021 | Lang | |
| 2021/0196382 A1 | 7/2021 | Mumaw et al. | |
| 2021/0196398 A1 | 7/2021 | Ye et al. | |
| 2021/0256719 A1 | 8/2021 | Hufford et al. | |
| 2021/0298869 A1 | 9/2021 | Wolf et al. | |
| 2021/0307841 A1 | 10/2021 | Buch et al. | |
| 2021/0338331 A1 | 11/2021 | Quaid, III | |
| 2021/0338342 A1 | 11/2021 | Abhari et al. | |
| 2021/0350934 A1 | 11/2021 | Kinsey et al. | |
| 2021/0390693 A1 | 12/2021 | Zhang et al. | |
| 2022/0031402 A1 | 2/2022 | Ye | |
| 2022/0079675 A1 | 3/2022 | Lang | |
| 2022/0087746 A1 | 3/2022 | Lang | |
| 2022/0104694 A1 | 4/2022 | Shelton, IV et al. | |
| 2022/0122263 A1 | 4/2022 | Yang | |
| 2022/0165403 A1 | 5/2022 | Asselmann et al. | |
| 2022/0207896 A1 | 6/2022 | Fouts et al. | |
| 2022/0287676 A1 | 9/2022 | Steines et al. | |
| 2023/0190136 A1 | 6/2023 | Kumar et al. | |
| 2023/0200625 A1 | 6/2023 | Kumar et al. | |
| 2023/0245753 A1 | 8/2023 | Kumar et al. | |
| 2023/0263573 A1 | 8/2023 | Bakhishev et al. | |
| 2023/0298336 A1 | 9/2023 | Fathollahi Ghezelghieh et al. | |
| 2023/0368398 A1* | 11/2023 | Figueroa-Alvarez | G06T 5/70 |
| 2024/0415580 A1 | 12/2024 | Barban et al. | |

FOREIGN PATENT DOCUMENTS

| | | | |
|---|---|---|---|
| JP | 2013509273 | | 3/2013 |
| JP | 2013513462 | A | 4/2013 |
| JP | 2016506260 | A | 3/2016 |
| JP | 2018537155 | A | 12/2018 |
| JP | 2019508072 | A | 3/2019 |
| KR | 10-1049507 | B1 | 7/2011 |
| WO | WO00/64367 | A1 | 11/2000 |
| WO | WO2004/095359 | A2 | 11/2004 |
| WO | WO2017002388 | A1 | 1/2017 |
| WO | WO2019/049503 | A1 | 3/2019 |
| WO | WO2019/050612 | A1 | 3/2019 |
| WO | WO2019/133071 | A1 | 7/2019 |
| WO | WO2020/017212 | A1 | 1/2020 |
| WO | WO2020035852 | A2 | 2/2020 |
| WO | WO2020/047051 | A1 | 3/2020 |
| WO | WO2021/144230 | A1 | 7/2021 |
| WO | WO2021/263174 | A1 | 12/2021 |
| WO | WO2022/197550 | A1 | 9/2022 |
| WO | WO2022/249190 | A1 | 12/2022 |
| WO | WO2023/043964 | A1 | 3/2023 |
| WO | WO2023/044507 | A1 | 3/2023 |
| WO | WO2023/168306 | A2 | 9/2023 |

OTHER PUBLICATIONS

Jonelagadda et al.; U.S. Appl. No. 19/101,587 entitled "System and methods for surgical collaboration," filed Feb. 5, 2025.

(56) References Cited

OTHER PUBLICATIONS

Petscharnig et al.; Binary convolutional neural network features off-the-shelf for image to video linking in endoscopic multimedia databases; Multimedia Tools and Applications; 77(21); pp. 28817-28842; Nov. 2018.

Petscharnig; Semi-automatic retrieval of relevant segments from laparoscopic surgery videos; InProceedings of the 2017 ACM on International Conference on Multimedia Retrieval; pp. 484-488; Jun. 6, 2017.

Schoeffmann et al.; Content-based retrieval in videos from laparoscopic surgery; InMedical Imaging 2016: Image-Guided Procedures, Robotic Interventions, and Modeling; SPIE; vol. 9786; pp. 562-571; Mar. 18, 2016.

Wei et al.; Real-time visual servoing for laparoscopic surgery; Controlling robot motion with color image segmentation; IEEE Engineering in Medicine and Biology Magazine: 16(1); pp. 40-45; Jan. 1997.

Stallmo et al.; U.S. Appl. No. 18/878,669 entitled "Surgical analytics and tools," filed Dec. 24, 2024.

Cheng et al.; Deep learning assisted robotic magnetic anchored and guided endoscope for real-time instrument tracking; IEEE Robotics and Automation Letters, 6(2); pp. 3979-3986; Mar. 17, 2021.

Demirel; A hierarchical task analysis of shoulder arthroscopy for a virtual arthroscopic tear diagnosis and evaluation platform (VATDEP); The International Journal of Medical Robotics and Computer Assisted Surgery; 13(3):e1799;29 pages; (Author Manuscript); Sep. 2017.

Jung et al.; Navigation-assisted anchor insertion in shoulder arthroscopy: a validity study; BMC Musculoskeletal Disorders; 21(1); pp. 1-9; Dec. 2020.

Buslaev et al.; Albumentations: Fast and flexible image augmentations; Information; 11(2); 125; doi:10.33990/info11020125; 20 pages; Feb. 2020.

Hertel; Trust and Behavioral Intention Toward Generative Adversarial Network (GAN)—Derived Avatar Healthcare Provider (HCP) in Simulated Telehealth Setting. The Florida State University; 2021; retrieved from the internet (https://diginole.lib.fsu.edu/islandora/object/fsu:803248/datastream/PDF/view); on Nov. 3, 2023.

Mildenhall et al.; NERF: representing scenes as neural radiance fields for view synthesis; Communications of the ACM; 65(1); pp. 99-106; Dec. 2021.

Jonelagadda U.S. Appl. No. 18/555,252 entitled "Systems and methods for using image analysis in superior capsule reconstruction," filed Oct. 12, 2023.

Jonelagadda et al. U.S. Appl. No. 18/843,235 entitled "Arthroscopic surgery assistance apparatus and method," filed Aug. 30, 2024.

Jonelagadda et al. U.S. Appl. No. 18/864,893 entitled "Surgery evidence report generation," filed Nov. 11, 2024.

Antico et al.; Deep learning-based femoral cartilage automatic segmentation in ultrasound imaging for guidance in robotic knee arthroscopy; Ultrasound in medicine & biology; 46(2); pp. 422-435; Nov. 22, 2019.

Jonmohamadi et al.; Automatic segmentation of multiple structures in knee arthroscopy using deep learning; IEEE Access; vol. 8; pp. 51853-51861; Mar. 10, 2002.

Jonelagadda et al.; U.S. Appl. No. 18/692,794 entitled "System and method for searching and presenting surgical images," filed Mar. 15, 2024.

Jonelagadda et al.; U.S. Appl. No. 18/693,945 entitled "System and method for computer-assisted surgery," filed Mar. 20, 2024.

Jonelagadda; U.S. Appl. No. 18/637,440 entitled Systems and methods for using image analysis in superior capsule reconstruction,f filed Apr. 16, 2024.

* cited by examiner

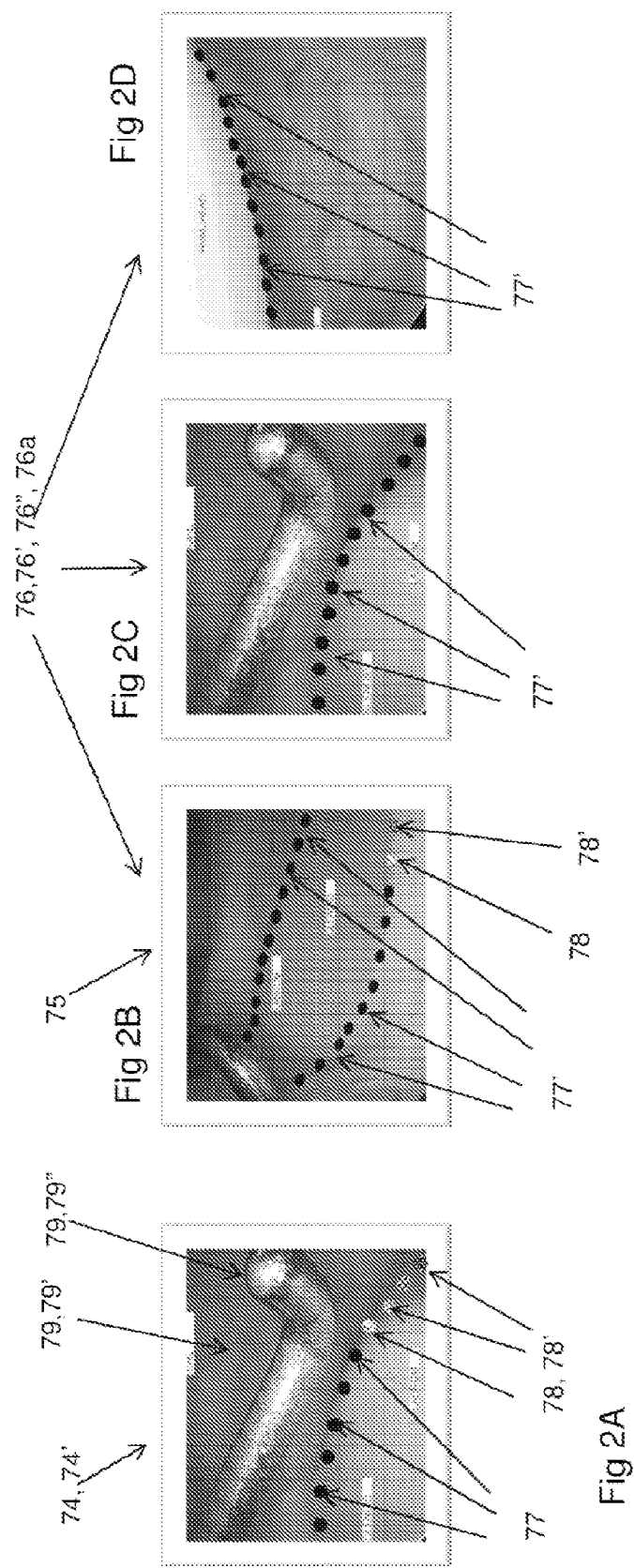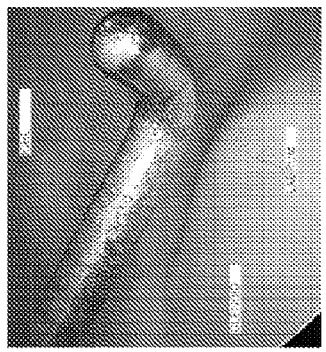

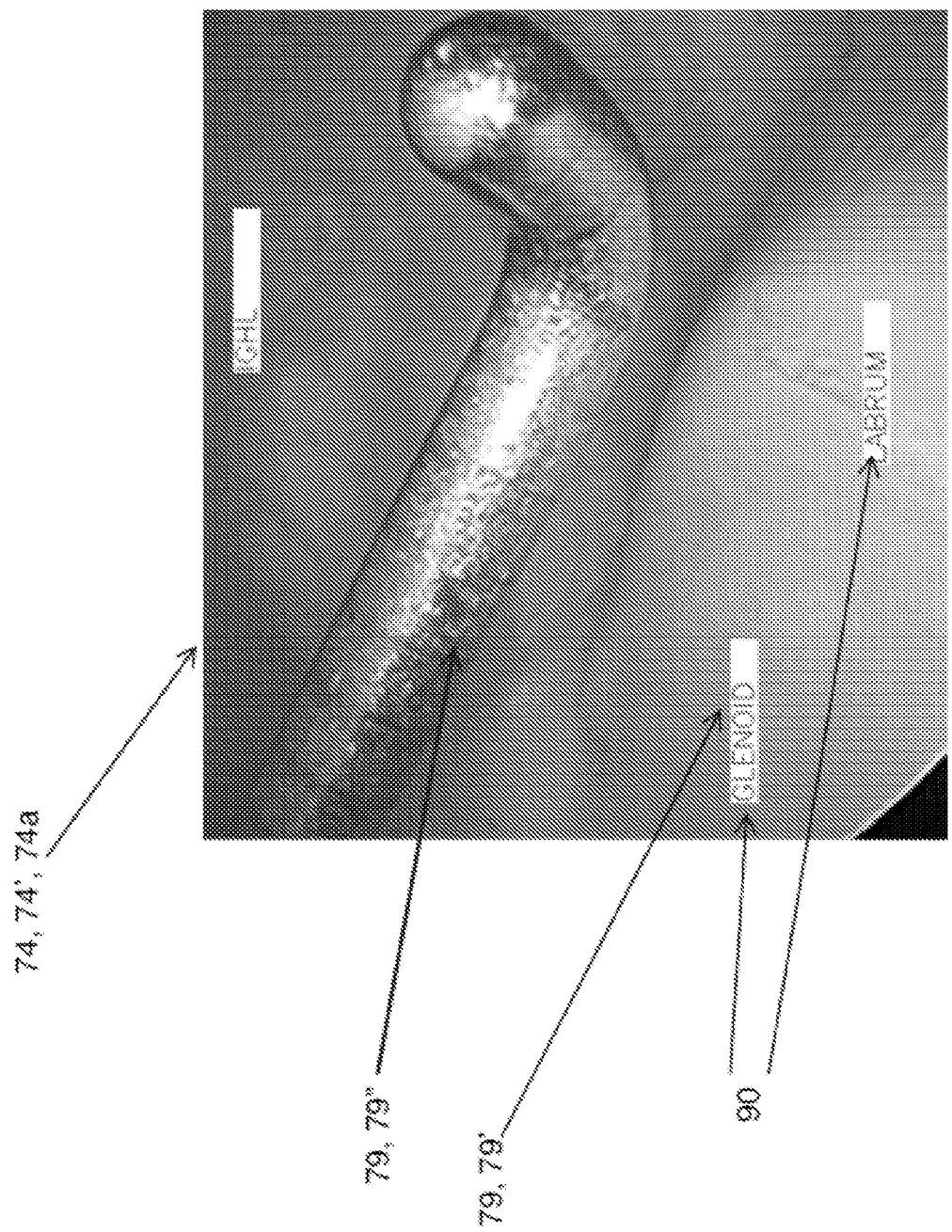
FIG. 2E2

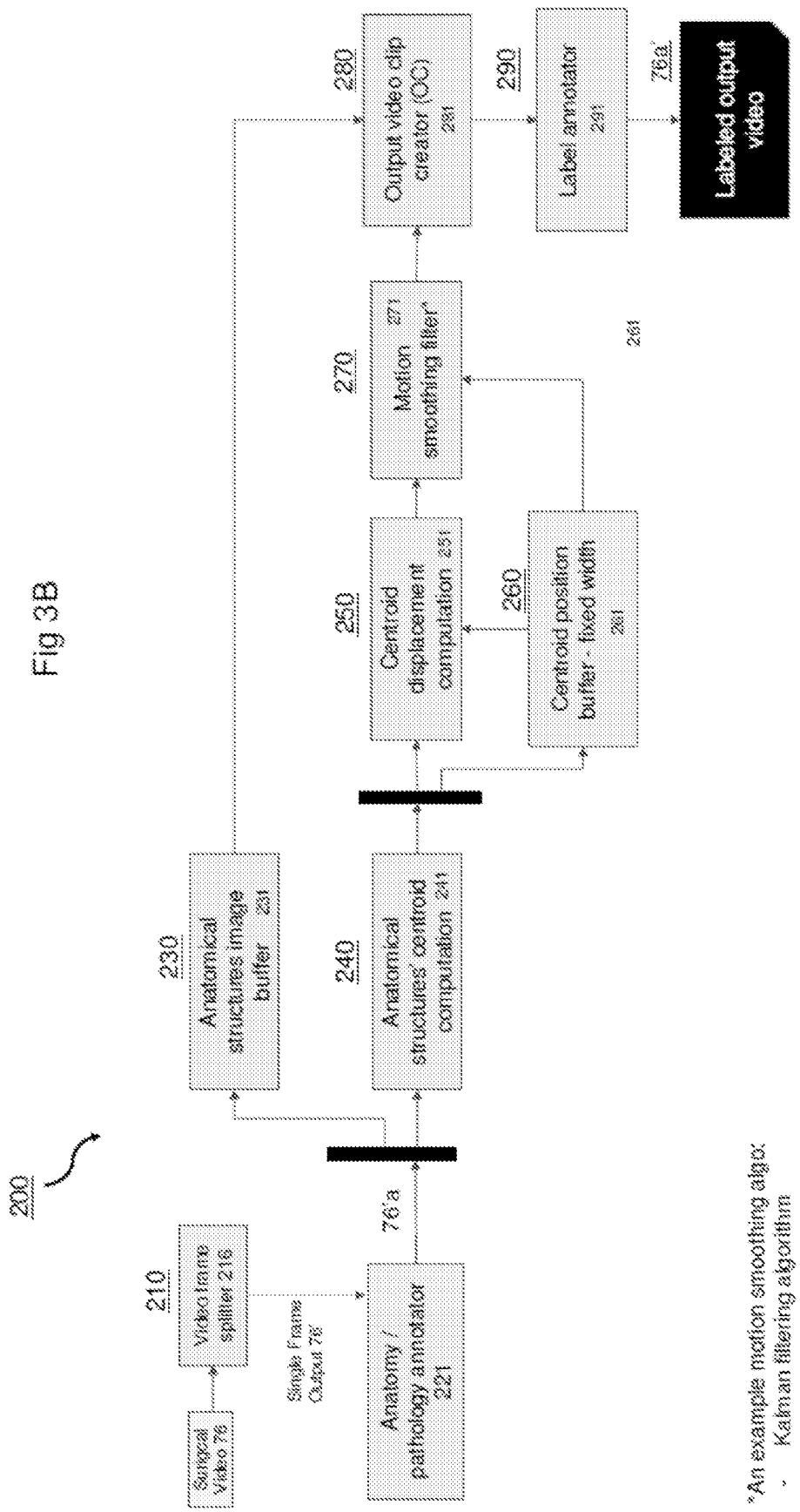

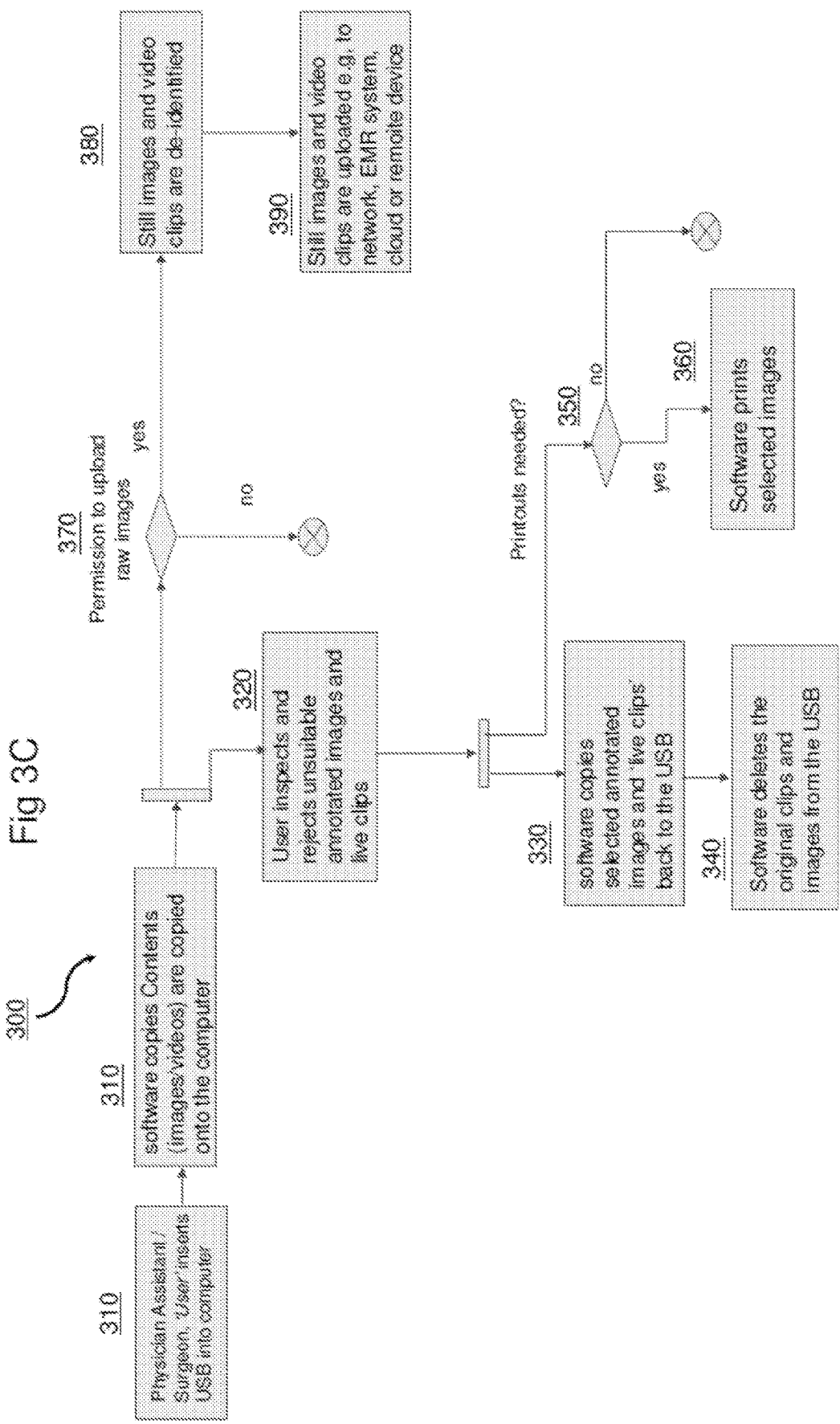

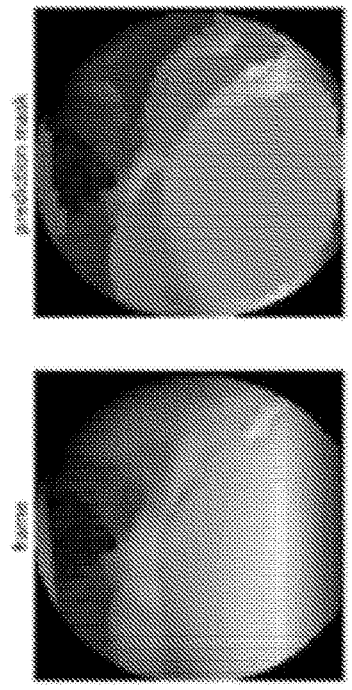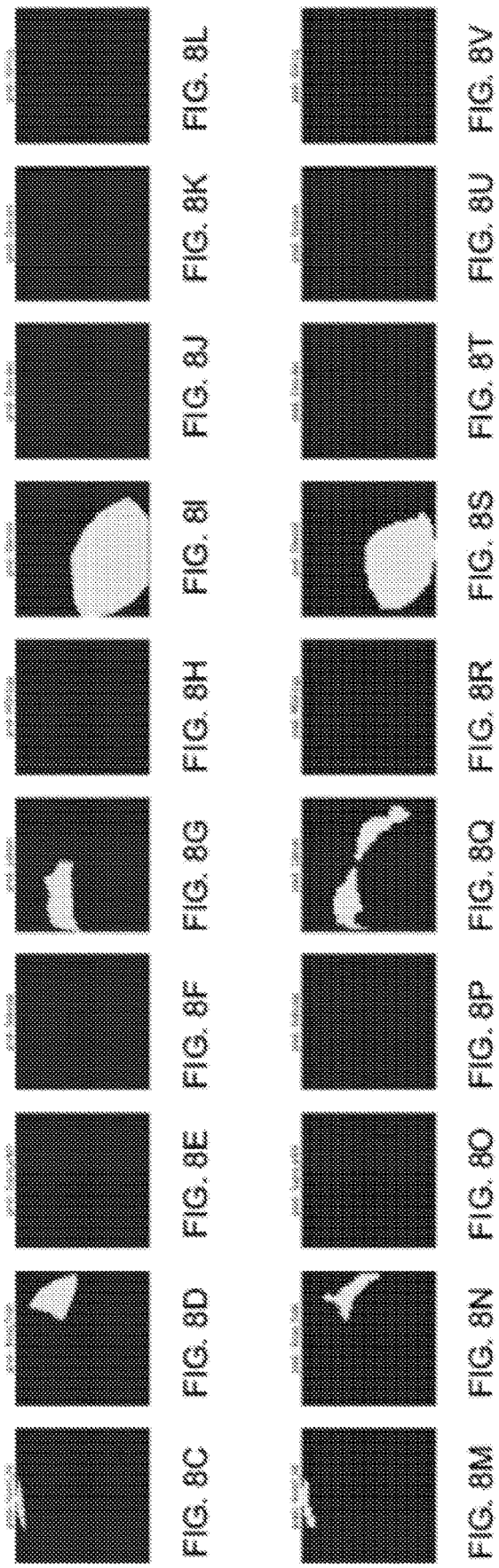

SYSTEMS AND METHODS FOR AI-ASSISTED MEDICAL IMAGE ANNOTATION

CLAIM OF PRIORITY

This patent application is a national phase application under 35 U.S.C. 371 of International Patent Application No. PCT/US2022/024504, titled "SYSTEMS AND METHODS FOR AI-ASSISTED MEDICAL IMAGE ANOTATION," filed Apr. 12, 2022, now International Patent Application Publication No. WO 2022/221342, which claims priority to U.S. Provisional Patent Application No. 63/173,935, titled "SYSTEMS AND METHODS FOR AI-ASSISTED MEDICAL IMAGE NOTATION," filed on Apr. 12, 2021, each of which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

BACKGROUND

In recent years, Artificial Intelligence (AI) has begun to be developed to be used to process images to recognize features of a human face as well as different anatomical structures in a human body. These AI tools can be used to automatically recognize an anatomical feature to help assist during a medical procedure. Computational methods such as machine learning and deep learning algorithms can be used for image or language processing to gather and process information generated in a medical procedure such a surgical procedure. The hope is to use AI algorithms that can then be used to predict or improve the outcome of the surgery or to guide educating new physicians through a virtual or educational procedure. However current AI-assisted surgical systems are far from ideal in many respects to be used, for example, to document a surgical procedure.

Accordingly, improved AI-assisted surgical systems and methods are desired.

SUMMARY OF THE DISCLOSURE

Described herein are apparatuses (e.g., devices, system, etc. including software, firmware and hardware) and methods to assist diagnostic and interventional medical procedures using Artificial Intelligence (AI). More particularly examples of the methods and apparatuses as described herein relate to devices systems and methods for annotating images captured during a surgical or other medical procedure using AI algorithms such as machine learning algorithms.

Examples of the methods and apparatuses as described herein relate to computer-implemented medical systems, devices, and methods to guide or assist with surgery and other medical procedure by identifying and labeling anatomical features in either in real-time or post operatively to guide and inform the physician as well as inform and educate the patient on their procedure, including what tissue or structures were repaired/treated and the success and other prognosis of the procedure.

Various example of the methods and apparatuses as described herein provides systems, devices, and methods that can receive imaging information from a medical procedure (e.g., a surgery) in the form of one or both of digital images or video of the procedure, process the received information to identify features an and other information associated with the procedure, and generate annotated output images or videos that include labels of the features and other information from the procedure. These features may include anatomical structures and tissue, including structures and tissue having pathology or injury as well surgical tools and surgical actions taken during the procedure. The annotated images and video are useful for documenting the procedure for review by physicians and patients in the latter case to communicate to the patient the nature of the procedure including the anatomical structures or tissue being repairs and the outcome. Various examples of the methods and apparatuses as described herein use Artificial Intelligence (AI) algorithms and/or computer architectures, including various machine learning algorithms, to perform one or more aspects of the annotation process including, for example, labelling various anatomical structures.

In a first aspect, the methods and apparatuses as described herein provides a method for creating an annotated visual summary of a minimally invasive surgical or other medical procedure performed on a patient such as an arthroscopic or endoscopic procedure. The method will typically be performed using one or more processors which include machine learning algorithms which may correspond to neural networks.

Such machine learning algorithms and neural networks are referred to as Artificial Intelligence (AI) algorithms, networks or sometimes just AI. The method includes extracting feature points from a single still image of the procedure and each frame of a sequential group of frames from a video of the procedure by an algorithm. The feature points may comprise visual attributes such as ridges or texture (e.g., in the anatomical structure or other image object in the image/frames) and secondary attributes derived from these visual attributes such as gradients in texture, color and the like. The still image and the video will typically be in digital form and are generated by or derived from an imaging device introduced into the patient during the procedure. Then the feature points of the still image are compared to the feature points of each frame of the group of frames from the video so as to determine a match between the still image and a given frame from the video and a sequence location in the video where the matched still image occurred. In particular examples of the comparison process, a sequence number of a particular still image is used to reduce the size of the group of frames from which visual features are extracted or compared to the still image, providing the advantage of speeding up the process and reducing the memory (e.g., buffer) and processing requirements of the system. Then a portion of the video containing the matched single image is copied and stored in memory resources (e.g., associated with the processor) so as to create a video clip typically in digital form. The video clip has a selected duration before and/or after a sequential location of the still image in the video with typical duration in the 5 to 10 second length though longer and shorter lengths are contemplated. Then a plurality of frames in the video clip are analyzed by an algorithm so as to identify image features in the video clip. The algorithm accounts for image features that are non-localizable and/or obscured in one or more frames such that a fidelity of identification of such an image feature is substantially unaffected. After a least a portion of the frames in the video clip are analyzed, at least one of the still image or the video clip are annotated with information from the medical procedure that includes or is derived from the identified image feature. Typically, the annotation comprises labelling at least one of the anatomical structures; defects, injuries or pathology in those structures; a repair to an injured anatomical structure, and implant made during the procedure such as a tissue graft, anchor such as bone screw, artificial ligament or tendon. The annotation can also include other information such as measurements between selected points in the image or frame, labelling of events during the procedure such as surgical actions taken (e.g., resection); a step in the procedure; start or completion of the procedure and surgical tools used during procedure (when they are in the field of view). Other annotated information can include the type of procedure (e.g., cartilage repair), date and time of the procedure, surgeon and medical facility information, and patient information. The annotated video clip and still image can then be copied to one or more USB memory devices such as flash drives, or other memory device which can be given to the patient as well as medical professionals associated with the patient's care including for example their physiatrists and physical therapist. Alternatively, the still images can be signaled over a wireless network, wired network or a wired streaming media connection to a cell phone or other portable communication/computing device, e.g., the patient's or that of medical personnel. In additional or alternative examples, the annotated image and video can be copied to a patient electronic medical record either using the memory device or can be signaled over a network (e.g., a wireless or wired network), a streaming media connection (e.g., HDMI or DisplayPort) or the Internet.

In general, annotation may be performed to video (including video clips), and/or still images (or images within the video). Annotation may be global (e.g., in reference to the entire video, portion of a video (e.g., multiple images or frames) and/or still images, and/or annotation may be associated with a structure, portion or sub-region within the video, video clip or still image, which may also be referred to as a label. Thus, as used herein labeling may refer to a subset of annotation that is associated with a structure, portion or sub-region within the video, video clip or still image. Labeling may include positioning an indicator and/or data (e.g., text, alphanumeric, symbol, color, etc.) on or near the associated structure, portion or sub-region.

In alternative or additional examples for the annotation process, the labelling may comprise placement of a label on a calculated centroid of an anatomical structure or other image feature in the video clip or still image when the anatomical structure is of a predetermined size. Also in this and related examples, movement of the anatomical structure may be detected in the video clip. In one or more examples, movement may detected be determining the sameness of a given structure through deformations and occlusions, with the sameness determined by means of an anatomy-aware feature tracking algorithm. Having detected the movement of the anatomical structure, the displacement of a label of the anatomical structure may then be detected from frame to frame in the video clip. Then, movement of the anatomical structure can be compensated for by adjusting the displacement of the anatomical structure label to move incrementally between positions, thereby reducing the perceived jitter in the labels. According to one or more examples the adjustment in or of the anatomical structure label cane be made using a motion smoothing filter such as a Kalman filtering algorithm.

In various examples, the minimally invasive medical procedure may correspond to orthopedic procedure, a GI procedure, a cardiovascular procedure, a urological procedure or a gynecological procedure. The orthopedic procedures may include various arthroscopic procedures known in the art including those used to repair tissue and structures in the knee and shoulder such as a torn rotator cuff or torn ligament. The GI procedures may correspond to various endoscopic procedures such as ulcer repair, sphincter repair, Nissan fundoplication, polyp removal and tissue biopsy procedures. The cardiovascular procedures may correspond to angiography, balloon angioplasty and stent deployment. The urological procedures may include repair of the bladder, removal of kidney stones and transurethral resection of the prostate (TURP). The gynecological procedure may correspond to one or more of a DNC, an ablation, cauterization or other treatment of endometriosis. Also, in these and related examples the imaging device may correspond to one or more of an arthroscope, endoscope, laparoscope or cardioscope.

Examples of the above and related methods are particularly useful for informing and/or educating a patient about their procedure, its outcome and the patient's subsequent prognosis. They are also useful for informing and educating both the surgeon and downstream medical personnel of the same with such information proving very useful in guiding, selecting and tracking physical therapy and other post-operative therapy. For example, the patient's physiatrist and/or physical therapist can use the annotated images and video in making decisions on the type of physical therapy, its post-operative starting point and the duration of therapy. Further, such information may also be used to guide the selection and dosage of various post-operative medications such as pain medication, NSAIDS, muscle relaxants, antibiotics and the like. Such guidance may include the titration of the dosage to the unique aspects of the patient's anatomy, injury and repair which are annotated or otherwise described in the annotated still images and video generated by examples of the methods and apparatuses as described herein.

In another aspect, the methods and apparatuses as described herein provides systems for annotating images and video from a minimally invasive or other medical procedure. According to one example, the system may comprise a laptop or other computer and one or more other associated devices or data structures including a USB or other memory device, a printer, a cell phone or other portable wireless communication device, a database and the Cloud. The computer has one or more computer processors (also referred to as processors) including at least one include at least one graphical processing unit or GPU. The processors include software modules (also referred to as processing modules) having algorithms for performing various operations associated with methods of the methods and apparatuses as described herein described herein (e.g., feature point extraction and comparison, image feature identification, etc.). The computer can include a port (e.g., a USB port) for connection to a flash drive/USB device or other memory device for inputting video and still images from a medical imaging device and the same or different flash drive for outputting the annotated still images and videos described herein. The computer will also typically include a radio frequency (RF) or other wireless communication device or circuitry for communicating with various external devices such as the printer, cell phone and a web portal device. The printer can be operatively to the computer (e.g., by means of wireless network or wired connection) and can be used to print annotated images generated by the laptop. The cell phone or other portable communication device can include at least one software application in the form of an application for wireless receiving, storing, displaying the annotated images and video from the laptop as well as performing other functions related to or using the annotated images and associated data. The computer can also be operatively coupled to a network via a portal such as a web portal for uploading or other form of transmission of the annotated video and images. The network may correspond to the Internet, an internet and/or extranet, or an intranet and/or extranet that is in communication with the Internet (e.g., by a wired or wireless network). For examples where the network is the Internet, the annotated images and video can be uploaded and then stored in the Cloud for retrieval by the patient and/or medical personnel. The computer can also be operatively coupled to a database (e.g., by a network such as the Internet) including for example an electronic medical record system such as EPIC for uploading and storing the annotated images and video and related information to an electronic medical record associated with the patient.

In various examples the processing modules can be configured to perform various operations associated with methods of the methods and apparatuses as described herein. These may include for example: receiving at least one image or video captured by an interventional imaging device (e.g., an arthroscope); extracting feature points from a single still image of the medical procedure and each frame of a sequential group of frames from a video of the medical procedure, comparing the feature points of the still image to the feature points of each frame of the group of frames from the video so as to determine a match between the still image and a given frame from the video and a sequence location in the video; copying a portion of the video containing the matched single image so as to create a video clip; analyzing a plurality of frames in the video clip so as to identify image features in the video clip, wherein a fidelity of identification of a particular image feature is substantially unaffected when the image feature is non localizable or at least partially obscure; and labelling or otherwise annotating at least one of the still image or the video clip with information from the medical procedure, the information including or being derived from the at least one image feature. In some examples, the identified image features comprise one or more of an anatomical structure or tissue, a structural defect or injury, a tissue pathology or injury a surgical tool, a surgical tool element, an operational procedure or an action, or a pathology. The processing modules may be embedded in the one or more processors, or they may be stored in non-transitory computer-readable storage media (e.g., ROM), operatively coupled to the processors, for storing instructions that are operable, when executed by the one or more processors, to cause the processors to perform various operations described herein.

In some examples, the processing modules may comprise a plurality of Artificial Intelligence (AI) modules including, for example, a machine learning algorithm, a deep learning algorithm, or a combination of both. In some examples, the machine learning algorithm may be or have the form of an artificial neural network. In particular examples the algorithms for performing one or more steps of the method (e.g., extracting features points, comparing feature points, analyzing frames in the video to identify image features (identification of image features)) is done using machine learning algorithms which may correspond to one or more neural networks. The machine learning algorithms may be resident on the one or more processors or other logic resources (e.g., firm ware, hardware or state devices) or computer readable media which are accessible/readable by or otherwise associated with the one or more processors. In particular examples, the operations of extraction of the feature points, comparison of the feature points and identification of image features is done by first, second or third machine learning algorithms which may be resident on the processing modules and/or other logic resources or computer readable media which are accessible/readable by or otherwise associated with the one or more processors. In additional examples, the annotation may also be performed by machine learning algorithm which may correspond to the third machine learning algorithm or a separate fourth machine learning algorithm.

In some examples, the processing modules comprise at least one dataset which may include one or more training data sets and test data sets. In some examples, the processing modules comprise an upstream module and a downstream module, where the downstream module is more specialized than the upstream module. In some examples, the upstream module is configured to identify one or more of an anatomy being operated upon by an operational procedure or an action being performed during the arthroscopic procedure. In some examples, the downstream module is configured to one or more of recognize an anatomical feature of the identified anatomy or recognize a treatment tool feature associated with the operational procedure or the action being performed. In some examples, the processing modules are organized into hierarchal architecture or hierarchy of upstream modules and downstream modules. Typically the downstream modules are more specialized in their operation than the upstream modules. For example, the upstream module can be used to identify a particular anatomical site being operated on or imaged and the downstream module can be used to identify particular anatomical structures or other feature of the image(s) at that anatomical site. In some examples, at least one of the upstream modules is configured to select a particular downstream module based on a calculation or output of the upstream module. For example, the upstream module may determine a particular anatomical site being operated on/being imaged such as the shoulder and, having made that determination, the upstream module then selects a particular downstream module to identify particular anatomical structures and other visual features at that site, e.g., the supraspinatus muscle, the bursa, tendons or the acromion. In this way, the speed and accuracy of anatomical structure and other visual feature identification and labelling can be significantly increased because a given downstream algorithm does not have to perform as much processing and/or does not require as much memory since the anatomical structures to be identified are more limited.

The identified image feature may comprise one or more of an anatomical structure; an injury, defect of pathology of the structure (e.g., torn or damaged cartilage), a surgical action, a surgical tool used during the procedure; and a subsequent repair to the injury, etc. of the anatomical structure. The surgical action may correspond to one or more of an RF cauterization or ablation, decompression, tissue or surface preparation, resection, cutting, suturing, initial diagnostic exam, range of motion assessment, tissue evaluation or debridement, irrigation, or wound closure. Also, the structure, defect and repair may be all be labelled in the same image or frame or in different images/frames depending upon where in the procedure the image/frame was capture. They may also have different color codes, e.g., separate label colors for the structure, injury and repair.

In various examples, the operational procedure or surgical action may be identified based at least partially on identifying the surgical tool or other related device used during the procedure. According to various examples, the interventional imaging device may correspond to an arthroscope used for various orthopedic procedures, an endoscope used for various gastro-intestinal (GI), esophageal, urological and gynecological procedures or a laparoscope used for various GI, urological or gynecological procedures. Also, in some examples one or more the algorithms and/or processing module is configured to identify one or more of a region of operation or an approach or portal of entry of the arthroscopic, endoscopic, or other minimally invasive procedure. In particular examples, the region of operation is a shoulder, knee or spine. In other examples, the region of operation is the abdomen, the heart, the female reproductive organs, the female urinary tract or the male urinary tract.

In some examples, at least one module from the processing modules is selected based at least on the task of identifying the one or more of the region of operation or the approach portal of entry for the imaging device, e.g., an arthroscope. In some examples, the operations performed further comprise storing the at least one image in a memory device. In some examples, the operations further comprise discarding the at least one image after the displaying the label elements to optimize memory usage.

In some examples, the labeled one or more image features further comprises: a pixel-level masked labeling, a bounding box labeling, a frame-level labeling, or a temporal labeling. The pixel-level masked labeling is used to display the labeled anatomical structure or the surgical tool.

The bounding box labeling is used to display the labeled pathology/defect/injury, the surgical tool, or a foreign object (e.g., an implant). The frame-level labeling is used to display a labeled anatomical region. The temporal labeling is used to display the labeled operational procedure or the action. In some examples, the operations further comprise providing a suggested action. In some examples, the suggested action is at least partially based on the labeling of the at least one image. In some examples, the suggested action is at least partially based on the upstream module. In some examples, the suggested action is at least partially based on the downstream module. In some examples, the suggested action is to assist the operator in the course of the surgery. In some examples, the suggested action is provided for educational purposes. In some examples, the suggested action comprises providing a safety warning based at least on identification of a critical anatomical structure, a surgical tool, an action, or a distance of two or more implants.

In some examples, one or more of the algorithm described above including for example those for extracting feature points, comparing feature points and identifying image features is trained using a database. In some examples, the database comprises a plurality of training images which may be images of one or more surgical procedures, surgical tools, surgical tool elements, anatomical structures, or pathologies. In some examples, a plurality of augmentation techniques is used to improve the training dataset to improve a robustness of the image recognition algorithm.

In some examples, the augmentation techniques comprise rotating the training images to improve the robustness against a position or an orientation of a patient during the arthroscopic procedure. In some examples, the augmentation techniques comprise flipping the training images along a vertical axis to improve the robustness against procedures performed on a right or a left side of a patient. In some examples, the augmentation techniques comprise enlarging or cropping the training images to improve the robustness against changes in a depth of view.

In some examples, the at least one image is generated from a surgical video stream. In some examples, the surgical video stream is an arthroscopic surgery video stream. In some examples, the surgical video stream is monocular. In some examples, the surgical video stream is stereoscopic.

Another aspect of the methods and apparatuses as described herein provides computer-implemented methods for guiding an arthroscopic or other minimally invasive surgical procedure. In some examples, the methods comprise: receiving at least one image captured by an interventional imaging device; identifying one or more image features in the received at least one image using an image recognition algorithm; labeling the identified one or more image features; and displaying the labeled one or more image features in the at least one image to an operator continuously in the course of the arthroscopic procedure. In some examples, the identified one or more image features comprising one or more of an anatomical structure, a surgical tool, a surgical tool element, an operational procedure or action, or a pathology. In some examples, the labeled one or more image features are displayed in real time or concurrent to the arthroscopic procedure.

In some examples, the arthroscopic procedure is an arthroscopic surgery. In some examples, the image recognition algorithm comprises a hierarchical arrangement of processing modules. In some examples, the processing modules comprise a plurality of Artificial Intelligence (AI) modules. In some examples, the processing modules comprise at least a machine learning algorithm, a deep learning algorithm, or a combination of both. In some examples, the machine learning algorithm comprises an artificial neural network.

In some examples, the processing modules include at least one dataset including for example at least one training dataset used to train the processing modules to perform one or more functions described herein such as the identification an annotation of anatomical structures and related pathology. In some examples, the processing modules comprise an upstream module and a downstream module, where the downstream module being more specialized than the upstream module. In some examples, the upstream module is configured to identify one or more of an anatomy being operated upon by an operational procedure or an action being performed during the arthroscopic procedure. In some examples, the downstream module is configured to one or more of recognize an anatomical feature of the identified anatomy or recognize a treatment tool feature associated with the operational procedure or the action being performed. In some examples, the processing modules comprise a plurality of upstream modules or a plurality of downstream modules. In some examples, the at least one of the plurality of upstream modules is configured to select an individual downstream module from the processing modules for use. In some examples, the operational procedure or the action is identified partially based on the identifying the surgical tool.

In various examples, the interventional imaging device may be one or more of arthroscope, endoscope or laparoscope. Accordingly, the image recognition algorithm can be configured to identify one or more of the imaging device, a region of operation of the imaging device (e.g., the shoulder for arthroscope) and a portal of entry of the image device (e.g., a bursal approach for shoulder surgery. In various examples the region of operation can be a joint such as the shoulder, knee or elbow. In some examples, at least one module from the processing modules is selected based at least on the identifying the one or more of the region of operation or the approach portal of entry.

In some examples, the labeled one or more image features further comprise: a pixel-level masked labeling, a bounding box labeling, a frame-level labeling, or a temporal labeling. In some examples, the pixel-level masked labeling is used to display the labeled anatomical structure or the surgical tool. In some examples, the bounding box labeling is used to display the labeled pathology, the surgical tool, or a foreign object. In some examples, the frame-level labeling is used to display a labeled anatomical region. In some examples, the temporal labeling is used to display the labeling the operational procedure or the action.

In some examples, the method is configured for a shoulder surgery. In some examples, the method is configured for a knee surgery. In some examples, the image recognition algorithm is trained using a database. In some examples, the database comprises a plurality of training images comprising one or more surgical procedures, surgical tools, surgical tool elements, anatomical structures, or pathologies.

In some examples, a plurality of augmentation techniques can be used to improve the training dataset to improve a robustness of the image recognition algorithm. In some examples, the augmentation techniques comprise rotating the training images to improve the robustness against a position or an orientation of a patient during the arthroscopic procedure. In some examples, the augmentation techniques comprise flipping the training images along a vertical axis to improve the robustness against procedures performed on a right or a left side of a patient. In some examples, the augmentation techniques comprise enlarging or cropping the training images to improve the robustness against changes in a depth of view.

In some examples, the at least one image is generated from a surgical video stream. In some examples, the surgical video stream is an arthroscopic surgery video stream. In some examples, the surgical video stream is monocular. In some examples, the surgical video stream is stereoscopic.

Another aspect of the methods and apparatuses as described herein provides a method of training an algorithm for annotating a medical procedure such as an arthroscopic or other surgical procedure. According to one or more examples the method comprises: receiving a set of image features based on one or more images relating to the arthroscopic procedure; receiving a training dataset; recognizing one or more of the image features in images of the training dataset; and building an image recognition algorithm based at least partially on the recognition of the one or more image features and the received training dataset. In some examples, the training dataset comprises one or more labeled images relating to the arthroscopic procedure. In some examples, the training dataset comprises one or more labeled images relating to the arthroscopic procedure one or more image features relate to visual properties of one or more of an anatomical structure, a surgical tool, a surgical tool element, an operational procedure or action, or a pathology. In some examples, the image recognition algorithm is configured to identify and label the one or more image features in an unlabeled image relating to the arthroscopic procedure.

In some examples, the labeled one or more image features are displayed in real time or concurrent to the arthroscopic procedure. In some examples, the image recognition algorithm comprises a hierarchical arrangement of processing modules. In some examples, the processing modules comprise a plurality of individual image processing modules. In some examples, the plurality of individual image processing modules may comprise a first module for identifying the arthroscopic procedure in place, a second module for recognizing and labeling one or more surgical tools and surgical tool elements, a third module for recognizing and labeling one or more anatomical structures, or a combination thereof.

In some examples, the processing modules comprise a plurality of Artificial Intelligence (AI) modules. Such modules may comprise at least a machine learning algorithm, a deep learning algorithm, or a combination of both. In some examples, the machine learning algorithm comprises an artificial neural network. In some examples, the processing modules comprise at least one dataset including at least one training dataset.

In some examples, the processing modules comprise an upstream module and a downstream module, where the downstream module being more specialized than the upstream module. In some examples, the upstream module is configured to identify one or more of an anatomy being operated upon by an operational procedure or an action being performed during the arthroscopic procedure. In some examples, the downstream module is configured to one or more of recognize an anatomical feature of the identified anatomy or recognize a treatment tool feature associated with the operational procedure or the action being performed. In some examples, the processing modules comprise a plurality of upstream modules or a plurality of downstream modules. In some examples, at least one of the plurality of upstream modules is configured to select an individual downstream module from the processing modules for use.

In some examples, identifying one or more image features in the at least one image further comprises selecting one or more processing modules from a plurality of processing modules, where the selection is at least partially based on the region and/or the portal of the arthroscopic surgery. In some examples, the operational procedure or the action is identified partially based on the identifying the surgical tool. In some examples, the unlabeled image is captured by an interventional imaging device. In some examples, the interventional imaging device is an endoscope. In some examples, the unlabeled image is generated from a surgical video stream.

In some examples, the surgical video stream is an arthroscopic surgery video stream. where the endoscopic surgery is an arthroscopic surgery. Other examples contemplate video streams from a laparoscopic device for one or more of gastro-intestinal, gynecological, urological. In some examples, the surgical video stream is monocular. In some examples, the surgical video stream is stereoscopic.

In some examples, the image recognition algorithm is configured to identify one or more of a region of operation or an approach portal of entry of the arthroscopic procedure. In some examples, the region of operation is a shoulder. In some examples, the region of operation is a knee. In some examples, at least one module from the processing modules is selected based at least on the identifying the one or more of the region of operation or the approach portal of entry.

In various examples, one or more of the modules or algorithms for recognizing an image feature can store the labeled image in a memory device that is part of the computer system executing module or algorithm. In some examples, the image recognition algorithm discards the labeled image to minimize memory usage.

In various examples, the labeled image may comprise: a pixel-level masked labeling, a bounding box labeling, a frame-level labeling, or a temporal labeling. In some examples, the pixel-level masked labeling is used to display the labeled anatomical structure or the surgical tool. In some examples, the bounding box labeling is used to display the labeled pathology, the surgical tool, or a foreign object. In some examples, the frame-level labeling is used to display a labeled anatomical region. In some examples, the temporal labeling is used to display the labeling the operational procedure or action.

In some examples, the training dataset is configured for a shoulder surgery. In some examples, the image recognition algorithm is trained for a shoulder surgery using the training dataset configured for a shoulder surgery. In some examples, the training dataset is configured for a knee surgery. In some examples, the image recognition algorithm is trained for a knee surgery using the training dataset configured for a knee surgery. In some examples, the training dataset comprises a plurality of training images comprising one or more surgical procedures, surgical tools, surgical tool elements, anatomical structures, or pathologies.

In some examples, a plurality of augmentation techniques is used to improve the training dataset to improve a robustness of the image recognition algorithm. In some examples, the augmentation techniques comprise rotating the training images to improve the robustness against a position or an orientation of a patient during the arthroscopic procedure. In some examples, the augmentation techniques comprise flipping the training images along a vertical axis to improve the robustness against procedures performed on a right or a left side of a patient. In some examples, the augmentation techniques comprise enlarging or cropping the training images to improve the robustness against changes in a depth of view.

Another aspect of the methods and apparatuses as described herein provides a method for implementing a hierarchical pipeline for guiding an arthroscopic surgery. In some examples, the system comprises one or more computer processors and one or more non-transitory computer-readable storage media storing instructions that are operable, when executed by the one or more computer processors, to cause the one or more computer processors to perform operations comprising: (a) receiving at least one image captured by an interventional imaging device; (b) identify one or more image features of a region of treatment or a portal of entry in the region based on at least one upstream module; (c) activating a first downstream module to identify one or more image features of an anatomical structure, or a pathology based at least partially on the identified one or more image features in step (b); (d) activating a second downstream module to identify one or more image features of a surgical tool, a surgical tool element, an operational procedure or action relating to the arthroscopic surgery based at least partially on the identified one or more image features in step (b); (e) labeling the identified one or more image features; and (f) displaying the labeled one or more image features in the at least one image continuously to an operator in the course of the arthroscopic surgery.

In some examples, the at least one upstream module comprises a first trained image processing algorithm. In some examples, the at least one upstream module comprises a first trained image processing algorithm first downstream module comprises a second trained image processing algorithm. In some examples, the at least one upstream module comprises a first trained image processing algorithm first downstream module comprises a second trained image processing algorithm second downstream module comprises a third trained image processing algorithm. In some examples, the steps (c) and (d) are independent from one another. In some examples, the first, second, or third trained image processing algorithms comprise at least a machine learning algorithm, a deep learning algorithm, or a combination of both.

In some examples, the machine learning or the deep learning algorithms are trained using at least one training dataset. In some examples, the training dataset is configured for a shoulder surgery. In some examples, the training dataset is configured for a knee surgery. In some examples, the training dataset comprises a plurality of training images comprising one or more surgical procedures, surgical tools, surgical tool elements, anatomical structures, or pathologies.

In some examples, a plurality of augmentation techniques is used to improve the training dataset to improve a robustness of the image recognition algorithm. In some examples, the augmentation techniques comprise rotating the training images to improve the robustness against a position or an orientation of a patient during the arthroscopic procedure. In some examples, the augmentation techniques comprise flipping the training images along a vertical axis to improve the robustness against procedures performed on a right or a left side of a patient. In some examples, the augmentation techniques comprise enlarging or cropping the training images to improve the robustness against changes in a depth of view.

In some examples, the first, second, or third trained image processing algorithms store the displayed images with labeled features in a memory device. In some examples, the first, second, or third trained image processing algorithms discard the displayed images with labeled features to minimize memory usage.

In some examples, the arthroscopic procedure is an arthroscopic surgery. In some examples, the at least one image is generated from a surgical video stream. In some examples, the surgical video stream is an endoscopic surgery video stream. In some examples, the surgical video stream is monocular. In some examples, the surgical video stream is stereoscopic.

Another aspect of the methods and apparatuses as described herein provides a non-transitory computer readable medium comprising machine executable code that, upon execution by one or more computer processors, implements any of the methods above or elsewhere herein.

Another aspect of the methods and apparatuses as described herein provides a system comprising one or more computer processors and computer memory coupled thereto. The computer memory comprises machine executable code that, upon execution by the one or more computer processors, implements any of the methods above or elsewhere herein.

Additional aspects and advantages of the methods and apparatuses as described herein will become readily apparent to those skilled in this art from the following detailed description, wherein only illustrative examples of the methods and apparatuses as described herein are shown and described. As will be realized, the methods and apparatuses as described herein is capable of other and different examples, and its several details are capable of modifications in various obvious respects, all without departing from the disclosure. Accordingly, the drawings and description are to be regarded as illustrative in nature, and not as restrictive.

Any of the methods described herein may be configured as a non-transitory computer-readable medium including contents that are configured to cause one or more processors to perform the method. For example, described herein are non-transitory computer-readable medium including contents that are configured to cause one or more processors to perform a method comprising: extracting feature points from a single still image of the medical procedure and each frame of a sequential group of frames from a video of the medical procedure using a first machine learning algorithm, the still image and the video generated by or derived from an imaging device introduced into an interior of the patient during the procedure; comparing the feature points of the still image to the feature points of each frame of the group of frames from the video so as to determine a match between the still image and a given frame from the video and a sequence location in the video where the matched still image occurred, the comparison being done using a second machine learning algorithm, wherein a sequence number of a particular still image is used to reduce a size of the group of frames from which image features are extracted or compared to the still image; copying a portion of the video containing the matched single image so as to create a video clip, the video clip having a selected duration before and/or after a sequential location of the still image in the video; analyzing a plurality of frames in the video clip so as to identify image features in the video clip, wherein a fidelity of identification of a particular image feature is substantially unaffected when the image feature is non localizable or at least partially obscured, the analysis performed using a third machine learning algorithm; and annotating at least one of the still image or the video clip with information from the medical procedure, the information including or being derived from the at least one image feature.

Furthermore, also described herein are systems configured to perform any of the methods described herein. In general, any of these systems may include one or more processors and a memory coupled to the one or more processors, the memory storing computer-program instructions, that, when executed by the one or more processors, perform the computer-implemented method. For example, described herein are systems comprising: one or more processors; and a memory coupled to the one or more processors, the memory storing computer-program instructions, that, when executed by the one or more processors, perform a computer-implemented method comprising: extracting feature points from a single still image of the medical procedure and each frame of a sequential group of frames from a video of the medical procedure using a first machine learning algorithm, the still image and the video generated by or derived from an imaging device introduced into an interior of the patient during the procedure; comparing the feature points of the still image to the feature points of each frame of the group of frames from the video so as to determine a match between the still image and a given frame from the video and a sequence location in the video where the matched still image occurred, the comparison being done using a second machine learning algorithm, wherein a sequence number of a particular still image is used to reduce a size of the group of frames from which image features are extracted or compared to the still image; copying a portion of the video containing the matched single image so as to create a video clip, the video clip having a selected duration before and/or after a sequential location of the still image in the video; analyzing a plurality of frames in the video clip so as to identify image features in the video clip, wherein a fidelity of identification of a particular image feature is substantially unaffected when the image feature is non localizable or at least partially obscured, the analysis performed using a third machine learning algorithm; and annotating at least one of the still image or the video clip with information from the medical procedure, the information including or being derived from the at least one image feature.

The methods and apparatuses described herein may be related to P.C.T. patent applications no. PCT/US21/27109, filed on Apr. 13, 2021, PCT/US21/27000, filed on Apr. 13, 2021 and PCT/US21/26986, filed on Apr. 13, 2021, each of which are fully are incorporated herein by reference in their entirety for all purposes.

All of the methods and apparatuses described herein, in any combination, are herein contemplated and can be used to achieve the benefits as described herein.

BRIEF DESCRIPTION OF THE DRAWINGS

A better understanding of the features and advantages of the methods and apparatuses described herein will be obtained by reference to the following detailed description that sets forth illustrative examples, and the accompanying drawings of which:

FIGS. 2A-2E2 are images which illustrate the process of identifying feature points in a captured still image and video from a surgical procedure and comparing the feature points to match the still image to a section of video containing the still image and then annotate the still image and a selected length of video containing the still image with identified image features. FIG. 2E2 shows an enlarged view of the image of FIG. 2E1.

FIG. 3B is a flow chart illustrating an example of a method for compensating for motion jitter of an annotated label by computing a centroid of a selected structure to be annotated and applying motion smoothing algorithms to the displacement of the centroid.

FIG. 3C is a flow chart illustrating an example of a workflow for generating annotated video and still images of a surgical procedures using examples of the methods and apparatuses as described herein.

FIG. 8A shows an example of an image of an arthroscopic surgical procedure, according to some examples.

FIG. 8B shows an example of an image of an arthroscopic surgical procedure labeled using image recognition algorithms, according to some examples.

FIGS. 8C-8L show examples of anatomical structures in images labeled by subject matter experts, according to some examples.

FIGS. 8M-8V show examples of anatomical structures in images labeled by AI algorithms, according to some examples.

DETAILED DESCRIPTION

Figure 1:
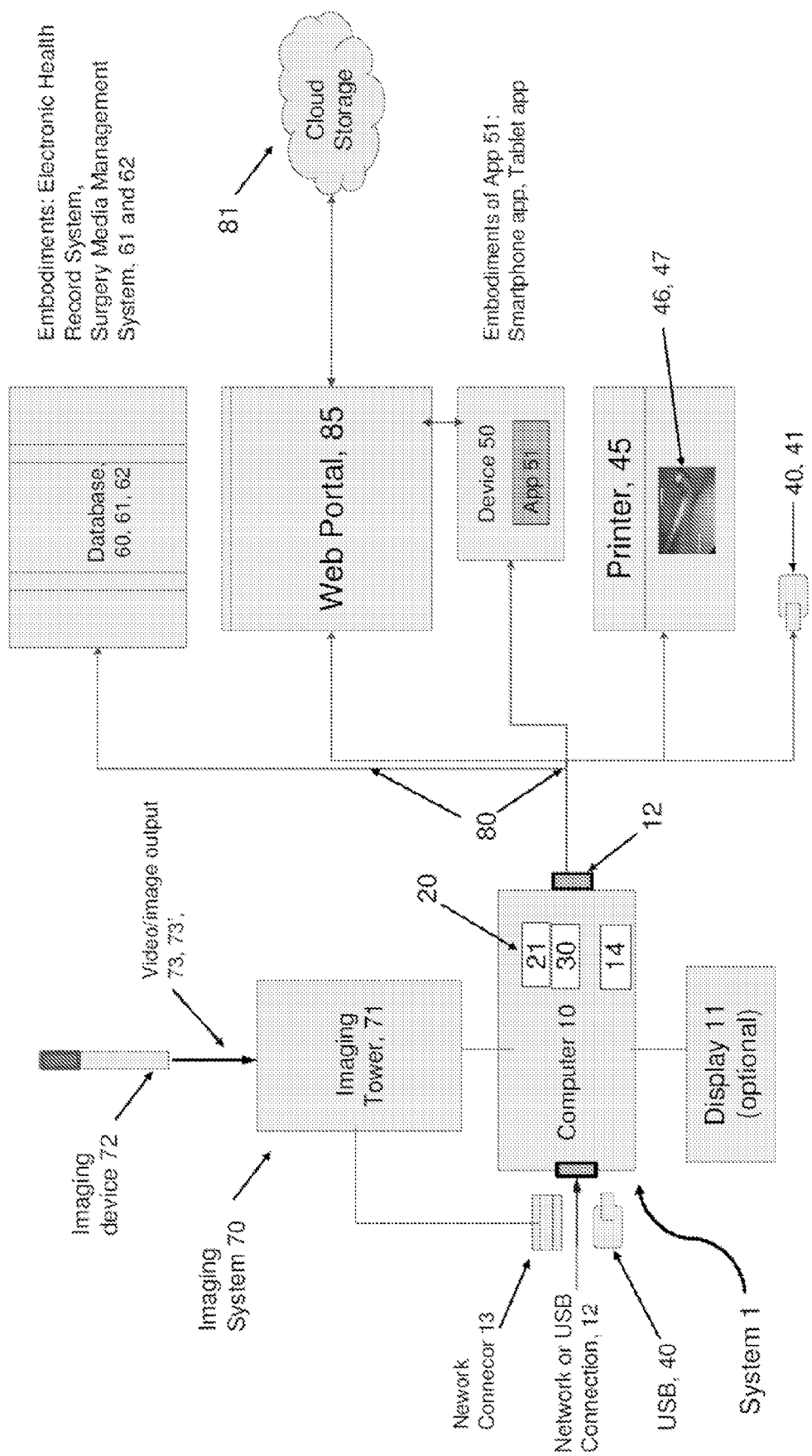
FIG. 1 is a schematic illustrating an example of a system for annotating images and video from a surgical procedure such as an arthroscopic or other minimally invasive procedure.

Described herein are methods and apparatuses that may provide computer-implemented medical systems, devices, and methods for annotating images and video from minimally invasive medical procedure such as one arthroscopic, endoscopic or laparoscopic procedure. The systems, devices, and methods disclosed herein may improve upon existing methods of annotation by providing an improved classification (of various elements involved in a surgical operation (e.g., surgical tools, anatomical features, operation procedures). For example, systems, devices, and methods provided herein may use AI methods (e.g., machine learning, deep learning) to build a classifier which classification of elements involved in a surgical operation. An AI approach may leverage large datasets in order gain new insights from the datasets. The classifier model may improve real-time characterization of various elements involved in an operation which may lead to higher operation success rate. The classifier model may provide an operator (e.g., surgeon, operating room nurse, surgical technician) with information for more accurate and timely decisions (e.g., labeling critical anatomical features in real-time).

Examples of the computer-implemented medical systems, devices described herein improve upon existing methods of clinical decision support systems by leveraging parameters related to various elements in the context of a surgical operation to generate accurate real-time information and decisions continuously well as generating post operative information such as annotated images derived from a video of the procedure. A surgical operation involves various elements such as the patient's body with various parts and anatomical complexity, plurality of tools and devices, actions based on the surgical procedure as well as actions based on a non-routine event that may occur in the surgery. The systems, devices, and methods disclosed herein can operate continuously with the changing environment of the surgical operation to make classifications and suggestions based on a plurality of AI modules organized to make decisions in a hierarchical manner. For example, the classifier described herein can classify anatomical features (e.g., shoulder, knee, organ, tissue, or pathology) while a view of the endoscopic camera may change during the operation. Similarly, the systems, devices, and method described here can recognize surgical tools as they appear in the field of view.

Examples of the systems, devices, and methods as disclosed herein may be used to classify various elements involved in a medical procedure such as minimally invasive surgical or other procedure. For example, the classifier disclosed herein can identify and label anatomical structures (e.g., anatomical parts, organs, tissues), surgical tools, or a procedure being performed in an operation. Examples of the methods and apparatuses as described herein may help with recognizing critical structures in a surgical or other medical procedure (e.g., nerves, arteries, veins, bone, cartilage, ligaments) or pathologies (e.g., a tissue that needs to be removed) both during surgery and post operatively so as to be able to annotate images of videos of the procedure. The critical structures may be visible or hidden in the field of view. The systems, devices, and methods described herein can identify and mark the critical structures (e.g., color markings on the video stream). Systems according to many examples may comprise a plurality of surgical AI modules organized to make decisions in a hierarchical manner.

Reference will now be made in detail to various examples, examples of which are illustrated in the accompanying drawings. In the following detailed description, numerous specific details are set forth in order to provide a thorough understanding of the methods and apparatuses as described herein and the described examples. However, it is specifically contemplated the examples of the methods and apparatuses as described herein may be practiced without these specific details. In other instances, well-known methods, procedures, components, circuits, algorithms have not been described in detail so as not to unnecessarily obscure aspects of the examples. In the drawings, like reference numbers designate like or similar steps or components.

As used herein, the term "if" is optionally construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" is optionally construed to mean "upon determining" or "in response to determining" or "in accordance with a determination" or "upon detecting" or "in response to detecting" that the stated condition precedent is true, depending on the context.

As used herein, the terms "subject" and "patient" are used interchangeably. As used herein, the terms "patient", "patients" "subject" and "subjects" usually refers to a human being. Who may be in variety of age ranges, including neonatal, pediatric, adolescent, adult and geriatric age ranges as is known in the medical arts? However it is contemplated that examples of the methods and apparatuses as described herein are also applicable and/or may be adapted for veterinary applications including for example canine, feline and equine.

Whenever the term "at least," "greater than," or "greater than or equal to" precedes the first numerical value in a series of two or more numerical values, the term "at least,"

"greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "surgical AI" or "surgical AI module", "medical procedure AI" as used herein, generally refer to a system, device, or method that uses Artificial Intelligence algorithms to assist before, during, and/or after a medical procedure such as a surgical operation for example to perform annotation of images or video from a surgery such as an arthroscopic surgery A surgical AI module can be defined as a combination of input data, machine learning or deep learning algorithms, training datasets, or other datasets.

The term "machine learning", as used herein, may generally refer to computer algorithms that can improve automatically over time. Any description herein of machine learning can be applied to Artificial Intelligence, and vice versa, or any combination thereof.

As used herein, the terms "continuous," "continuously" or any other variation thereof, generally refer to a substantially uninterrupted process or a process with time delay that is acceptable in the context of the process.

The terms "video stream," or "video feed", as used herein, refer to data generated by a digital camera or other digital imaging device known in the art. Video feed may be a sequence of static or moving images.

The terms "region," "organ," "tissue," "structure", as used herein, may generally refer to anatomical features of the human body. A region may be larger than an organ and may comprise an organ. An organ may comprise one or more tissue types and structures. A tissue may refer to a group of cells structurally joined to complete a common function. A structure can refer to a part of a tissue. In some examples, a structure may refer to one or more parts of one or more tissues joined together to create an anatomical feature.

The terms "surgical field of view," or "field of view," as used herein, refer to the extent of visibility captured by an interventional imaging device. Field of view may refer to the extent of visual data captured by a digital camera that is observable by human eye. The term "decision," as described herein, may refer to outputs from a machine learning or AI algorithm. A decision may comprise labeling, classification, prediction, etc.

The term "interventional imaging device," as used herein, generally refers to an imaging device used for medical purposes. The interventional imaging device may refer to an imaging device that is used in a surgical operation. The surgical operation, in some examples, may be a simulation of an operation.

The term "operator," used herein, refers to a medical professional involved in a surgical operation. An operator can be a surgeon, an operating room nurse, a surgical technician.

According to some examples, the medical procedure can be an arthroscopic procedure such as an arthroscopic surgery (or arthroscopy). An arthroscopic surgery can be a minimally invasive surgical procedure (e.g., requires only a small incision), for example on a joint such as the knee, shoulder or elbow. The arthroscopy may also comprise a diagnostic procedure. The arthroscopy may also comprise surgical repairs, such as, for example, debridement, or cleaning, of a joint to remove bits of torn cartilage, ligament reconstruction, or synovectomy (removal of the joint lining). The arthroscopy can be performed using an arthroscope. The arthroscope may be inserted into a subject's body to perform the arthroscopic procedure in or around the joint through a small incision. The arthroscope may be an endoscope. The arthroscope may comprise a fiberoptic scope. The arthroscope may be flexible or rigid. The arthroscope may comprise a camera (e.g., a digital camera), a light source, a lens to create the image of the field of view, or a mechanism to carry the image to a sensor. The sensor may comprise a global shutter (e.g., a CCD sensor) or a rolling shutter (e.g., a CMOS sensor). The images captured by the arthroscope or other imaging device may be displayed on a display (e.g., a monitor). An operator (e.g., a surgeon) may use the displayed images (e.g., video feed from the arthroscope) to perform the surgery.

Arthroscopic and other surgeries may use small incisions through which tools and endoscopes may access a joint to diagnose or repair a pathology. Due to the minimally invasive nature of the procedure, patients may experience less pain, heal faster than conventional surgeries or experience less bleeding. However, arthroscopic surgeries can be more technically demanding than conventional surgeries (e.g., an open surgery). In arthroscopy, an operator (e.g., a surgeon) may operate with limited field of view, using small tools and with a restricted range of movement. Since the field of view may restricted, the surgeon may, for example, have to pan the scope to cover a target anatomy. Nonlimiting examples of challenges associated with an arthroscopic surgery (or other surgery using an imaging device) may comprise tracking a target location, such as, for example, an intended repair location, a recognition of a pathology (e.g., cancerous tissue), critical structures (e.g., nerves, arteries, veins, bone, cartilage, ligaments), etc.; visual orientation with respect to an anatomical structure; intraoperatively measuring of a dimension (e.g., sizing a rotator cuff tear); keeping track of bones or tissue boundaries for placing an implant when using a graft; a field of view that may not be sufficient for an operator to place an anchor in a predefined location, where the procedure may require a larger field of view; or correlating preoperative diagnostic imaging with intraoperative field of view to, for example recognize a critical sight. The critical sight may correspond to one or more of a pathology (e.g., a tumor or a cyst), a predefined implant or repair site. In various examples, the systems and methods provided herein may be configured for one or more of shoulder surgery, knee surgery or spine surgery.

In some examples, an image captured by an imaging device (e.g., an arthroscope) may be received by a computer system. The computer system may include an image recognition or algorithm. The image recognition algorithm may identify one or more features in the image received from the arthroscope. The image recognition algorithm may be configured to identify one or both of a region of operation or an approach portal of entry (or a portal) of the arthroscopic procedure (e.g., an arthroscopic surgery). In some examples, the region of operation is a shoulder. In some examples, the region of operation is a knee.

The image recognition algorithm may comprise a processing module. The image recognition algorithm may comprise an arrangement of processing modules. The arrangement of processing modules may be hierarchical. For example, a hierarchical arrangement of processing modules may comprise a first processing module that may be upstream of a second processing module and/or downstream of a third processing module. The image recognition algorithm may comprise at least two processing modules an upstream module and a downstream module. In some examples, the downstream module may be more specialized (e.g., configured to identify features associated with a particular anatomical structure, pathology, tissue type, procedure, etc.) than the upstream module. In some examples, a module may be a generic module. A specialized module may comprise a portal recognition module, an anatomy recognition module, modules associated with specific anatomical structures (e.g., a shoulder module, a knee module), a pathology recognition module, modules associated with a specific pathology (e.g., cancer, defects in the cartilages, rotator cuff tears, dislocated/torn labrum, torn ACL, anterior cruciate ligament, torn meniscus, torn bicep tendon, inflamed synovial tissue, or femoral acetabular impingement (FAI)) or a pathology measurement module. A generic module may comprise a tool recognition module, an action recognition module (e.g., drilling, grinding, cleaning, etc.). In some examples, the processing module may comprise a plurality of upstream modules, a plurality of downstream modules, or a combination of both. In some examples, at least one of the plurality of upstream modules may be configured to select at least one downstream module from the plurality of downstream modules of the processing modules to further process an image. In some examples, identifying one or more features identified in the image may further comprise selecting one or more processing modules from the plurality of AI modules, wherein the selection is at least partially based on an output from at least one upstream module. In some examples, a processing module is selected based at least on the identifying the one or more of the region of operation or the approach portal of entry (or portal).

In some examples, an upstream module may be configured to identify one or more of an anatomy being operated upon by an operational procedure or an action being performed during the arthroscopic procedure. In some examples, a downstream module may be configured to recognize one or more of an anatomical feature of the identified anatomy associated with the operational procedure or a procedural action being performed (e.g., to correct or repair a pathology or injury to the anatomy). In some examples, a downstream module may be configured to recognize a treatment tool feature associated with the operational procedure or the action being performed.

According to one or more examples, one or more of the processing modules may comprise an Artificial Intelligence (AI) module. In some examples, the processing modules may comprise a plurality of AI modules. In some examples, the processing modules or the plurality of AI modules may comprise at least a machine learning algorithm, a deep learning algorithm, or a combination of both. The machine learning algorithm may comprise a trained machine learning algorithm. The machine learning algorithm may comprise an artificial neural network. In some examples, the processing modules or an AI in the processing modules may comprise at least one dataset, for example at least a training dataset.

Various examples of the methods and apparatuses as described herein provides systems and methods for annotating images and video from surgical procedure including minimally invasive surgical procedures such as arthroscopic procedure for repair of the shoulder, knee, hip, spine or other location. Referring now to FIG. 1A, an example of a system 1 for performing such annotations may comprise computer 10 and one or more other associated devices or data structures including a USB or other memory device 40, a printer 45 and a cell phone or other portable wireless communication device 50. In various examples computer 10 may be a laptop, chipset or mother board and includes one or more computer processors 20 (also referred to as processors) including at least one graphical processing unit or GPU 21. The processors 20 include software modules 30 (also referred to as processing modules 30) having algorithms for performing various operations associated with methods of the methods and apparatuses described herein (e.g., feature point extraction and comparison, image feature identification, etc.).

In one or more examples, computer 10 may be a laptop or other portable computer device (e.g., a tablet or smart phone device) which can be taken into the operating room or positioned outside of it. In such examples computer 10 will typically include a display 11 allowing for display of images and video (such was annotated video and images) and for display of various user interfaces including a graphical user interface. In other examples, computer 10 can be in the form of a chip set or mother board which can be contained in wrack or other modular structure allowing for plug in or other integration with an operating room imaging system 70 such as an imaging tower 71 (e.g., such as those manufactured by Stryker or Smith and Nephew) which connects to and receives video output 73 and/or still image output 73' from one or more imaging devices 72 such as an arthroscope, endoscope and the like. The video output will typically be in the form of video 76.

The computer can include at least one port 12 (e.g., a USB port) for connection to a portable memory device 40 or a network connector/connection device 13 for connection to a network 80. Memory device 40 will typically correspond to a USB flash drive 41 for inputting video and still images from a medical imaging device 72. Other portable memory devices known in the art are also contemplated. The same or different memory device 40 (e.g., flash drive 41) can be used for outputting the annotated still images and videos described herein. Computer 10 will also typically include an RF or other wireless communication device 14 for communicating with various external devices such as the printer 45, cell phone 50 and a web portal device 85 for connection to the Internet 81 or other network 80. The printer 45 can correspond to a bubble jet or other printer known in the art and can be operatively to computer 10 (e.g., by means of wireless network or wired connection) and can be used to print a printout 46 of annotated images 47 generated by software modules 30 residing on laptop 10 or other computer or processor connected to the printer.

The computer can also be operatively coupled to a network 80 via a portal such as a web portal 85 or other c for uploading or other form of transmission of the annotated video and images. The network may correspond to the Internet 81, an internet and/or extranet, or an intranet and/or extranet that is in communication with the Internet 81 (e.g., by a wired or wireless network). For examples where the network is the Internet, the annotated images and video can be uploaded and then stored in the Cloud 85 for retrieval by the patient and/or medical personal. network 530 can be the Internet, an internet and/or extranet, or an intranet and/or extranet that is in communication with the Internet. In additional examples, network 80 can be a telecommunication and/or data network. In these and related examples, network 80 can include one or more computer servers, which can enable distributed computing, such as cloud computing. The network 80, in some examples with the aid of system 1 and/or computer 10, can implement a peer-topeer network, which may enable devices (e.g., a computer) coupled to the computer system 1 to behave as a client or a server.

In some examples, system 1 can also include a database 60 which can be operatively coupled to computer 20 e.g., by mean of a network 80 which may be wired or wireless. In various examples database 60 may be an electronic medical record system 61 such as EPIC, for uploading and storing the annotated images and video and related information to an electronic medical record associated with the patient. It may also correspond to a surgery media management system 62 such as the iSuite® media management system manufactured by Stryker Inc.

Wireless communication device 50 will typically correspond to a cell phone but may also be a tablet, smart watch or other wireless device known in the art. It can include at least one software application 51 in the form of an application for receiving, storing and displaying the annotated images 47 and video from the computer 10 as well as performing other functions related to or using the annotated images and associated data.

FIGS. 2A-2E2 illustrate another example of the methods and apparatuses for creating an annotated visual summary of a minimally invasive surgical (or other medical procedure) performed on a patient, such as an arthroscopic or endoscopic procedure. The method will typically be performed by a system such as the system of FIG. 1 and may use one or more processors 20 (e.g., microprocessors) which may include software modules 30 employing machine learning algorithms which may correspond to neural networks. Such machine learning algorithms and neural networks are referred to as Artificial Intelligence (AI) algorithms, AI networks or sometimes just AI. The method includes extracting feature points 77 from a single still image 74 of the procedure and each frame 75 of a sequential group of frames 76, 76', 76" from a video of the procedure by an algorithm such as an AI algorithm. The feature points 77 may comprise visual attributes 78 such as ridges or texture 78' (e.g., in the anatomical structure or other image object in the image/frames) and secondary attributes derived from these visual attributes such as gradients in texture, color and the like. The still image 74 and the video will typically be in digital form and are generated by or derived from an imaging device introduced into the patient during the procedure. Then the feature points 77 of the still image are compared to the feature points 77' of each frame of the group of frames from the video so as to determine a match between the still image 74 and a given frame 75 from the video and a sequence location in the video where the matched still image occurred. In particular examples of the comparison process, a sequence number of a particular still image 74 is used to reduce the size of the group of frames from which feature points are extracted or compared to the still image 74, providing the advantage of speeding up the process and reducing the memory (e.g., buffer size) and processing requirements of the system. Then a portion of the video containing the matched still image 74' is copied and stored in memory resources (e.g., that associated with the processor 20) so as to create a video clip 76a typically in digital form. The video clip has a selected duration before and/or after a sequential location of the still image in the video with typical duration in the 5 to 10 second length though longer and shorter lengths are contemplated. Then, a plurality of frames in the video clip are analyzed by one or more algorithms so as to identify image features 79 in the video clip 76a such as anatomical structures 79', injuries, defects or pathology in an anatomical structure and surgical tools 79" used in the procedure. The algorithm accounts for image features that are non-localizable and/or obscured in one or more frames such that a fidelity (e.g., accuracy) of identification of such an image feature is substantially unaffected. After a least a portion of the frames in the video clip are analyzed, at least one of the still image 74 or the video clip 76a are annotated with information from the medical procedure that includes or is derived from the identified image features 79 so as to yield an annotated image 74" and video. Typically, the annotation comprises creating a label 90 for an identified image feature 79 including the name of the feature or other information associated with the image feature, at least one of the anatomical structures; defects, injuries or pathology in those structures; a repair to an injured anatomical structure, and implant made during the procedure such as a tissue graft, anchor such as bone screw, artificial ligament or tendon. The annotation can also include other information such as measurements between selected points in the image 74 or frame 75, labelling of events during the procedure such as surgical actions taken (e.g., resection, ablation, etc.); a step in the procedure; start or completion of the procedure and surgical tools used during procedure (e.g., an ablation/cautery electrode). Other annotated information can include the type of procedure (e.g., cartilage repair), date and time of the procedure, surgeon and medical facility information, and patient information. The annotated video clip 76a and/or still image 74a can then be copied to one or more USB devices, flash drives, or other memory device 40, 41 which can be given to the patient as well as medical professionals associated with the patient's care including for example their physiatrists and physical therapist. Alternatively, the still images and video can be signaled over a network 80 such as a wireless network, wired network or a wired streaming media connection to a cell phone or other portable communication/computing device 50, e.g., the patient's or that of medical personnel. In additional or alternative examples, the annotated image 74a and video 76a can be copied to a patient electronic medical record 61 either using the memory device or can be signaled over a network 80 (e.g., a wireless or wired network), a streaming media connection (e.g., HDMI or DisplayPort) or the Internet 81.

Figure 3A:
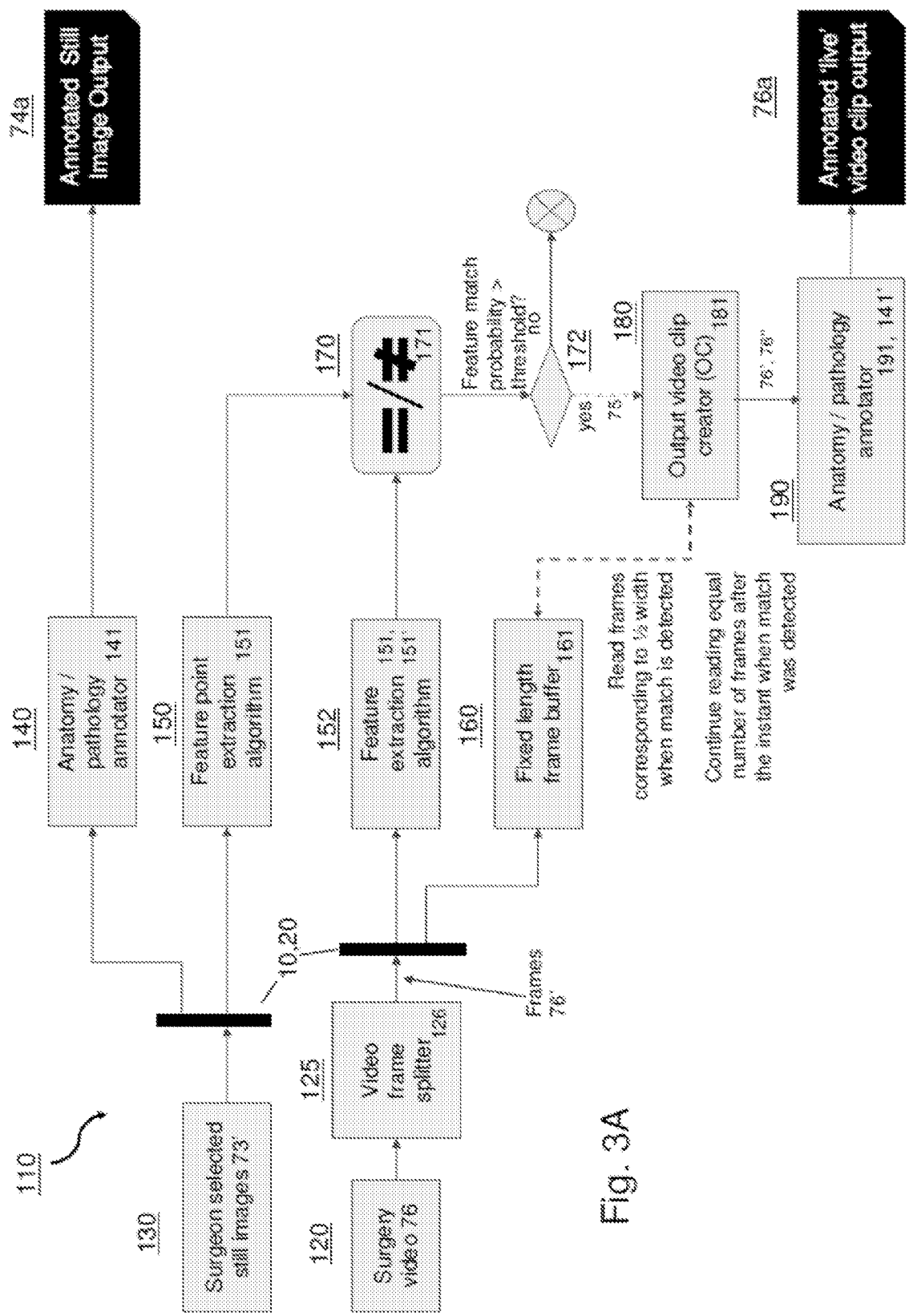
FIG. 3A is a flow chart illustrating an example of a method of generating and annotating a video clip and still image of a surgery by comparing visual aspects of the still image to a captured video of the surgery and determining where in the video the still image occurred and generating the video clip based on the location of the still image and then annotating the video clip and still image.

Referring now to FIGS. 3A-3C, various examples of methods of the methods and apparatuses as described herein will now be discussed including methods of annotation of still images and video. FIG. 3A is a flow chart illustrating a method 110 for performing annotating of images and video according to one or more examples of the methods and apparatuses as described herein. First in a video capture step 120, a video stream of a minimally invasive surgical procedure generated by an imaging device 72 (e.g., an arthroscope) is captured or otherwise electronically stored on an imaging tower 71 (or other imaging storage system 70) over the course of a minimally invasive procedure employing an imaging device (e.g., an arthroscope.

Concurrently to video capture step 120, a physician in the operating room (typically a surgeon) takes or otherwise selects individual images of the procedure (using a digital camera or video device) in an image selection step 130. Alternatively, the image(s) selection step 130 can be done after video capture 120. Also, in alternative examples including those for example, using remote or telemedicine, the images may be taken by a physician remotely monitoring the procedure by a video network link to the video stream for example via Zoom™, Google Meet™ etc.

After the image selection step 130, the selected images 73' can be input into computer 10 and/or processor 20 where an annotation step 140 can be done using an annotator algorithm 141 to annotate one or more of the anatomy, pathology or surgically repaired tissue shown in the still image. In specific examples, the annotation can include labelling of one more of the anatomy, pathology, and surgically repaired tissue and measurement of one or both along with other information. The result from the annotation algorithm is an annotated still image 74*a*.

Before, concurrently or after step 140, a feature point extraction step 150 is done on still image 73' using feature extraction algorithm 151 to extract feature points 77 from the still image which are then inputted into a comparator algorithm/module 171 to compare with feature points 77' from frames 76' of video 76 in a comparator step 170 described more fully below along with the function of comparator 171.

After the video is captured from the imaging device, a video frame splitting operation 125 is done by a frame splitter 126 then input into computer 10 and/or processor 20. Then a feature point extraction step 152 is done using a feature extraction algorithm 151' to extract feature points 77' from individual frames 76' from the video 76 in similar fashion as feature points 77 are extracted from still images 73'. Also feature extraction algorithm 151' can be one in the same or similar to feature point extraction algorithm 151 described above.

Before, concurrently or after step 152, frames 76' from video 76 can inputted to fixed length frame buffer 161 in a buffering step 160. The number of frames 76' stored in buffer 161 corresponds to a selected frame/temporal length of video clip 76" as is more fully descried below.

The feature point outputs 77 and 77" of feature extraction steps 150 and 152 are then compared in a comparative step 170 by a comparator algorithm 171. If in step 172, a determination is made if the feature match between two or more features in the still image and the frame of the video exceeds a probability threshold, the matched frame 75 from the video 76 is then sent to an output video clip creator (OC) 181 which creates the video clip in a step 180. In creating the video clip, the video clip creator inputs and reads a selected number of frames from frame buffer 161 before and after from when the matched frame was detected with the number of frames read in either direction corresponding to half of a selected width (i.e., number frames) of the frame buffer. The selected width in turn corresponds to a selected time interval (e.g., 2, 5, 10, 15 seconds) of the frame buffer. In other words, OC 181 creates a video clip having a time length double that of a selected time period (e.g., 2, 5, 10, 15 seconds) from when the matched frame was detected. After OC 181 creates the video clip 76*a* including frames 76", the OC may output the video clip to an anatomy pathology frame annotator module/algorithm 191 where the frames of the video are annotated 190 to create an annotated video clip 76*a*. In specific examples, the annotation can include labelling of one more of the anatomy, pathology, and surgically repaired tissue and measurement of one or both along with other information. Annotator module 191 may be one in the same or similar to module 141 used to annotate still images 74'.

In general, annotation may include the addition of information that identifies anatomy, pathology, etc., and may be done (as part of) a video clip, which may form a patient report. Thus, video clips may be formed from the original video and may be annotated. Video clips may include patient identifying information (including patient health record information). In contrast, raw video may be formed from the original video by removing all patient-specific references and information, although non-specific information may be added or included as part of the raw video. For example, raw video may be preprocessed but not labeled or annotated; raw video may include procedure and other autodetected tags. Thus, raw video (also referred to herein as labeled output video) may be tagged and de-identified. As described herein the original video, which may be large (e.g., file size) and may include patient specific data) may be held in a transient buffer when forming the video clip(s) and/or raw video before it is erased/destroyed. As used herein, tagging may be different from annotations; tagging may refer specifically to information that is not specific or indicative of patient identity, and which may not be used to identify the patient.

In alternative or additional examples for the annotation process, labelling may include placement of a label on a calculated centroid of an anatomical structure or other image feature in the video clip or still image when the anatomical structure is of a predetermined size. Also in these and related examples, movement of the anatomical structure may be detected in the video clip and having been detected may be compensated for to prevent motion jitter (or jittering) of the label due to movement of the anatomical structure in the surgical field of view. In one or more examples, movement may detected be determining the sameness of a given structure through deformations and occlusions, with the sameness determined by means of an anatomy-aware feature tracking algorithm. Having detected the movement of the anatomical structure, the displacement of a label of the anatomical structure may then be detected from frame to frame in the video clip. Then movement of the anatomical structure can be compensated for by adjusting the displacement of the anatomical structure label to move incrementally between positions, thereby reducing the perceived jitter in the labels. According to one or more examples, the adjustment in or of the anatomical structure label can be made using a motion smoothing filter such as a Kalman filtering algorithm.

One example of a method 200 for compensating for motion of anatomical structure to prevent jittering of an annotated label of the structure is shown in FIG. 3B. First, the surgical video 76 from an arthroscope or other imaging device are split into individual frames 76' in a video frame splitting step 210 by a video frame splitter 216 (either in software by an algorithm or software by algorithm). The single frame output 76' is then annotated with labelling of the anatomical structures and any associated pathology in an annotation 220 step by annotating algorithm/module 221. The outputted annotated frames 76' and/or data describing them are then fed into an anatomical structures image structure buffer 231 in an image buffering step 230. The outputted annotated images 76'a are also inputted into algorithm 241 which computes the centroid of the structure in a step 240. The centroid computation is then fed into centroid position buffer 261 in a step 260.

Then in step 250, the displacement of the centroid due to motion of the anatomical structure is calculated by a module/algorithm 251 which also receives an input from the centroid position buffer 260. Subsequently in step 270 a smoothing filter algorithm 271 such as a Kahlman filtering algorithm is used to smooth the motion of the anatomical structure and/or its centroid with the output feed into an output video clip creator 281 (which also receives an input from image buffer 231) in an output video creation step 280. The resulting generated video is then input into a label annotator algorithm/module 291 label annotation step 290 which generates a labelled output video 76*a'* with reduced annotation label jitter.

An example of a method 300 of a workflow for creating annotated still images 74*a* and a video clip 76*a* according to one or more examples of the methods and apparatuses as described herein is shown in FIG. 3C. First a medical practitioner (e.g., surgeon, physician's assistant or nurse) inserts a USB flash drive (herein a USB) or other portable memory device into a computer 10 performing one or more operations of the annotation process. Then in step 310, software (e.g., software modules 30) resident on computer 10 or other computer or computer system copies the images, video and other related contents of the USB onto the computer. The computer then displays the images/video on the computer display or an external display and the users inspects the images/video in a step 320 and rejects any unsuitable/unwanted images and video. Then in step 330, the software copies the non-rejected annotated images and video (e.g., live clips) back to the USB. Then in step 340, the software deletes the original images and video clips from the USB (e.g., those images that were originally copied onto the USB by the medical practitioner). A decision is made by a medical practitioner (or other personnel) in step 350 as to whether a printout is needed of one or more selected images (in one or more examples, the software may prompt the medical practitioner or other user if printouts are need and of what images) If printouts are chosen, they are printed by the software in step 360.

According to some examples of method 300, the annotated still images and video may also be uploaded to one more of a network (e.g., the Internet), the cloud, an electronic medical records system (e.g., EPIC) or other data storage system or an external device or (e.g., an external computer, tablet or smart phone) in steps 370-390. First in step 380 permission needs to be obtained from one or more of the patient and/or medical practitioner to do the upload. The permission can be record via an electronic signature and/or consent process which electronically stores the approver's signatures. If permission is not obtained, the process stops there. If permission is obtained, the still images and video (e.g., raw video) is typically de-identified in a step 380 (i.e., the patients identifying information such as their name, address and social security number are removed). Finally in step 390 the now de-identified still images and raw video are uploaded to one or more of a selected network, EMR system, cloud or remote device (e.g., external computer, etc.)

Figure 3D:
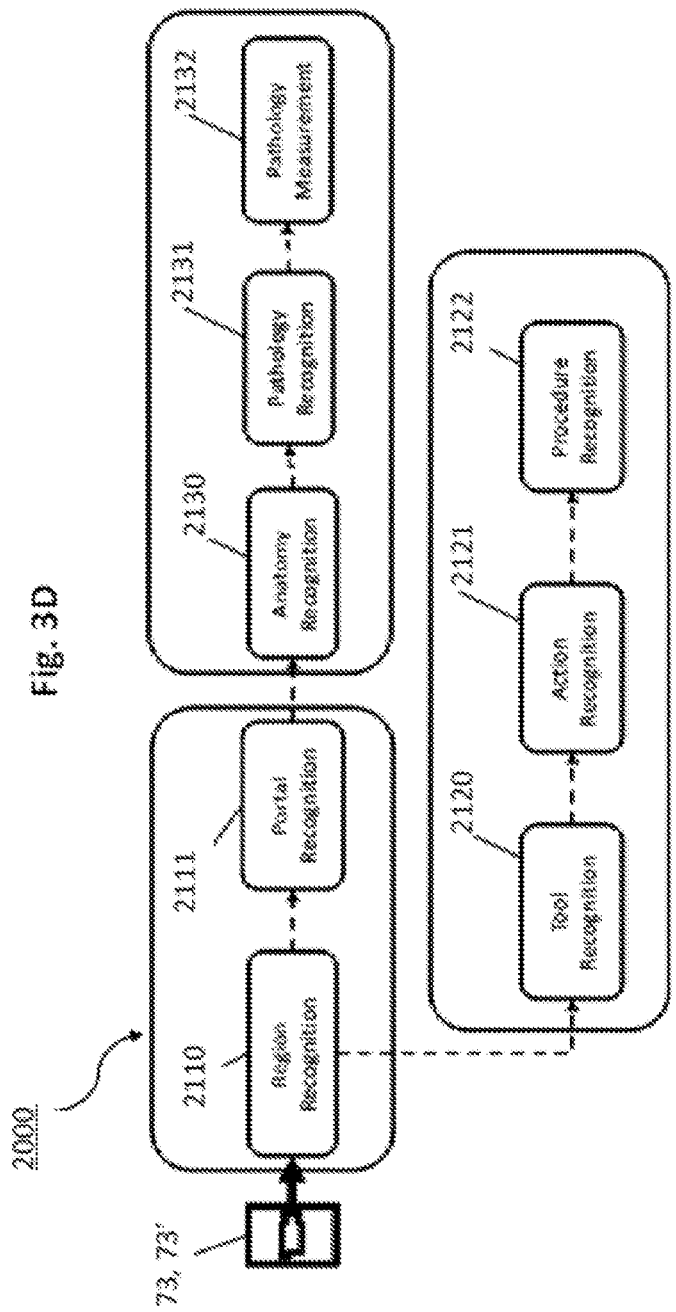
FIG. 3D is a flow of an example of hierarchical arrangement of modules used in an AI based system for assisting with surgery or annotating or images or video from the surgery such as an arthroscopic or other minimally invasive procedure.

FIG. 3D is a flow chart which illustrates an example of a hierarchical arrangement 2000 of software modules 2030 aka module (which may correspond to modules 30) used in one or more examples of the methods and apparatuses as described herein (e.g., with system 1, and/or computer 10) to perform labelling and other annotation functions. Such modules may reside on or otherwise be operable by examples of computer 10 described above. According to one or more examples, a first module in hierarchical arrangement 2000 may be a region recognition module 2110 which is configured to determine an anatomical region (e.g., the shoulder, knee, hip etc.) in a field of view where a surgical operation or other medical procedure is being performed. Typically, region recognition module 2110 will make its determination based on one or more images 73, 73' (e.g., a frame from a video feed or a still image) it receives an imaging device 71 (e.g., an arthroscope, endoscope, etc.) used during the surgery or other medical procedure. In cases where the region recognition module 2110 does not recognize an anatomical region (also referred to as a field of view or surgical field of view) in the image, module 2110 may then stop transfer of the image to other modules and/or discard the frame. In cases where module 2110 does recognize a field of view in the image, module 2110 may then send the image to other modules downstream of the module 2110 with such modules comprising a generic module, a specialized module, or both. For example, modules downstream of 3110 may comprise a portal recognition module 2111, a tool recognition module 2120, or both. In some examples, the image may be sent to two or more modules substantially simultaneously (e.g., in parallel). In alternative examples, the image may be sent to two or more modules consecutively (e.g., in series). The image may be sent to a tool recognition module 2120, an action recognition module 2121, or a procedure recognition module 2122 in order mentioned herein. In some cases, the module 2120 may recognize a tool in the image.

Subsequently, module 2121 may then determine an action based at least in part on the recognized tool. The module 2121 may then send the image to a procedure recognition module, which then determines a surgical procedure being performed based at least in part on the determined action and/or the recognized tool. The module 2110 may also send the image to the module 2111 in parallel to the module 2120. The module 2111 may then determine a portal of entry associated with the region recognized by module 2110. Based at least in part on the portal of entry recognized by module 2111, one or more specialized modules may activate which are associated with that particular portal of entry and then receive and process subsequent images (e.g., video) from an imaging device used during the procedure. In various examples the specialized modules comprise a processing pipeline (herein pipeline) specialized for a particular anatomical site (e.g., the shoulder, a knee, hip, a spine etc.) The specialized modules in such a pipeline may include AI trained modules for a specific anatomical structure and/or corresponding pathology such as that for the shoulder and a torn rotator cuff. Further the pipeline can be further configured to perform a particular sequence of functions (e.g., a hierarchy of functions) such as anatomical recognition, pathology recognition, pathology measurement which streamlines the processing and analysis of the images (and associated information from the images) to yield faster output e.g., faster display of labelled anatomical structures and pathology or generation of selected measurements at the surgical site. According to one or more examples, such a pipeline of Hierarchical functions comprises an anatomy recognition module 2130 which identifies anatomy in the surgical field of view and based on that determination, then sends the image to a pathology recognition algorithm 2131 and based on that determination sends the image to a pathology measurement module 2132. Because the pipeline is specialized to a particular anatomical site, less memory, programming and processing capability/power are required of a computer system performing analysis and processing of images received from an imaging device used during the surgery. These reduced performance requirements (e.g., reduced memory, processing power) allows for various image processing functions such as one more of anatomical, pathology recognition and associated be done by device in or near operating room (aka an edge device), rather than having to be done remotely e.g. via the Cloud which further speeds up the process and makes it more reliable since no data need be sent up and back over the Internet to the Cloud or an external computer device. Moreover, in various examples no Internet or other network connection is required at all. In this way, one or more of the reliability, speed and cybersecurity of example of the methods and apparatuses as described herein including one or more of system 1, computer 10 and computer system 501 are substantially improved.

In various examples, labeling an image feature further comprises one or more of a pixel-level masked labeling, a bounding box labeling, a frame-level labeling, or a temporal labeling. In some examples, the pixel-level masked labeling is used to display the labeled anatomical structure or the surgical tool. In some examples, the bounding box labeling is used to display the labeled pathology, the surgical tool, or a foreign object. In some examples, the frame-level labeling is used to display a labeled anatomical region. In some examples, temporal labeling is used to display the labeling of the operational procedure or the recognized action.

Figure 7A:
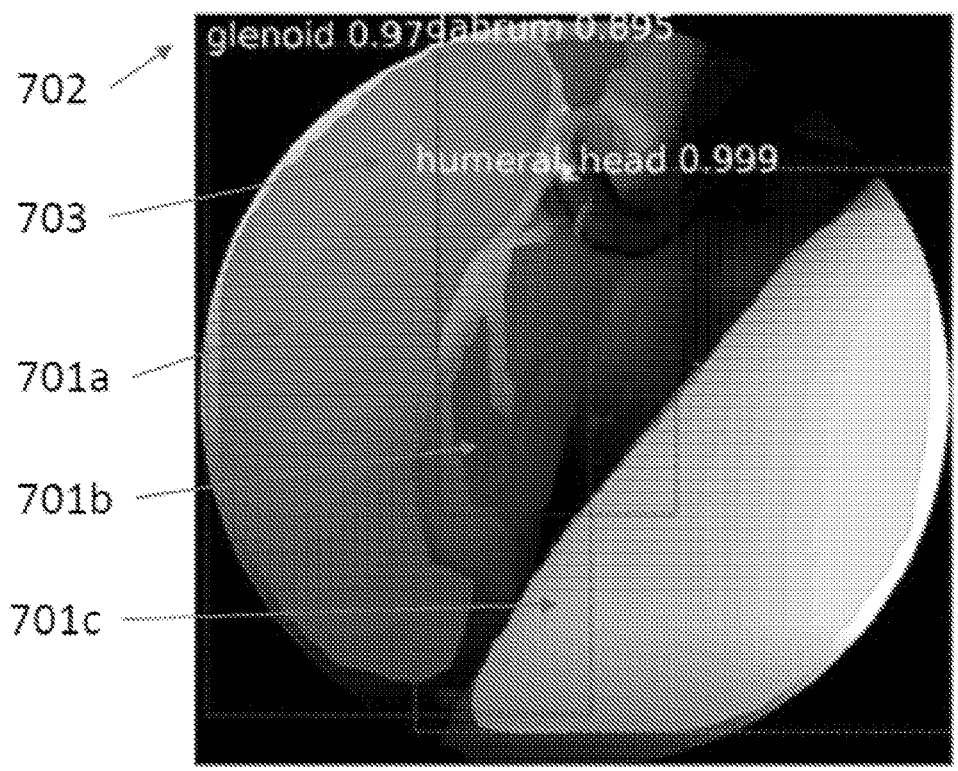
FIG. 7A shows an example of recognizing and labeling anatomical structures, according to some examples.
Figure 7B:
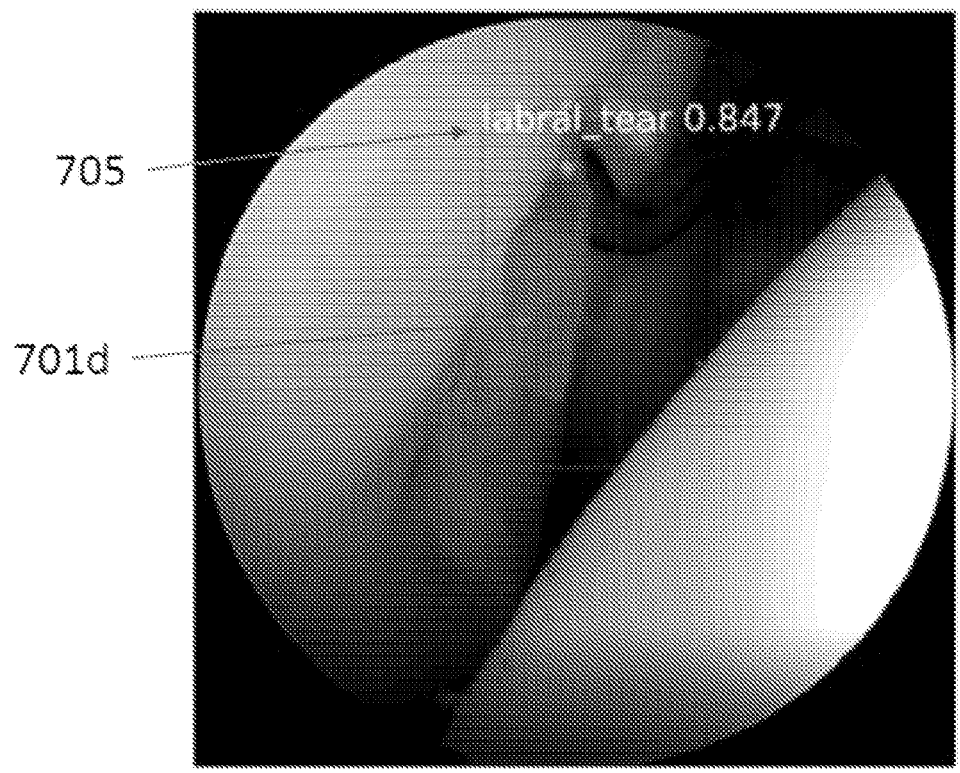
FIG. 7B shows an example of recognizing and labeling a pathology, according to some examples.

Examples of labeled images are shown in FIGS. 7A-7B. An anatomy recognition module may recognize and label anatomical structures (FIG. 7A). Different color masks 701a, 701b, 701c, 701d, along with descriptive labels 702, 703 may be used to differentiate the recognized anatomical structures. FIG. 7B shows an example of a pathology which has been identified and labeled using a colored mask 701d as well as a descriptive label 705. For example, a tear has been detected and labeled in the labrum (FIG. 7B).

FIG. 2A shows an image of an arthroscopic surgical procedure. The image was then provided as an input to the system described herein. The image was processed using an image recognition model configured to analyze shoulder surgery images. The image recognition model may comprise specialized modules. For example, the specialized module may be used to analyze intraarticular region (FIG. 2A-2B). FIG. 2B shows an example of labeling features in the image provided in FIG. 2A using the methods and systems described herein.

FIG. 8A-8V show examples of identifying various features in a surgical procedure using the systems and methods described herein. An image from the surgical field of view (e.g., a frame of a video stream) may be provided (FIG. 8A). The image recognition model may produce predictions for different classes of anatomical structures (e.g., humeral head, glenoid, subscap, bisect, ligaments, tendons, etc.) that can be recognized in the input image (FIGS. 8M-8V). The predictions made by the recognition model were compared to a series of labels generated for the same classes of anatomical structures made by subject matter experts (FIGS. 8C-8K). After predicting distinct classes of anatomical structures, the predictions are combined into an output image (FIG. 8B). The output image may contain different color masks to differentiate different classes of anatomical structures identified. The classification process described herein may be applied to consecutive frames received from a video camera. The labeled output image may then be overlaid on the video stream. The overlay may be performed in real-time or in substantially close to real-time.

In some examples, the operations further comprise providing a suggested action to an operator (e.g., a surgeon). The operator may be performing the procedure (e.g., arthroscopic surgery). The operator may be a person other than the surgeon. The operator may operate the imaging device (e.g., an arthroscope). In some examples, the suggested action is to assist an operator in the course of the surgery (e.g., an arthroscope). For example, a surgeon may require a measurement of a tissue or pathology, and the methods and systems described herein may provide the measurement to the surgeon intraoperatively. In some examples, the suggested action may comprise a safety warning to allow the operator to know of a potential safety issue. For example, the system may recognize a distance of one or more implants being implanted in a patient to be different from a predefined safe distance. The distance may be a distance between two or more implants from one another. In some examples, the distance may be a distance of one or more implants from an anatomical structure, an anatomical feature, or a pathology. A suggested action may comprise avoiding a critical anatomical feature such as, for example, a vein, an artery, nerves, bone, cartilage, or ligaments. In some examples, the suggested action comprising a safety warning is based at least on an identified anatomical feature, a recognized tool, an identified action or a combination thereof. For example, a tool may be recognized (e.g., a burr grinder) that may potentially damage a tissue (e.g., a cartilage). When the system recognizes a tool, for example, a burr grinder in close proximity of a tissue recognized, for example, as cartilage, the system may generate a safety warning. A suggested action may comprise suggesting an approach angle for a device. The approach angle may be an approach angle of a drilling tool. In some examples, the suggested action is provided for educational purposes. For example, a video stream of a medical procedure (e.g., arthroscopy) can be used for educational purposes e.g. to educate medical practitioners (doctors and residents) during or after the surgery. The methods and systems described herein may be used to label features overlaid on the video stream (e.g., images or frames of the video stream).

The suggested actions may also be overlaid on the video stream for educational purposes.

In some examples, the suggested action is at least partially based on the labeling (e.g., labeling of the features) of the image. The suggested action may be at least in part based on an output from one of the plurality of modules (e.g., upstream modules, or downstream modules). In some examples, the suggested action is at least partially based on the output from at least one of the plurality of upstream modules. In some examples, the suggested action is at least partially based on the output from at least one of the plurality of downstream modules.

In some examples, the image may be generated from a surgical video stream. In some examples, the surgical video stream is an arthroscopic surgery video stream. In some examples, the surgical video stream is monocular or stereoscopic. In some examples, the labeling of features on an image may be performed at a speed similar to a rate of acquiring images from an imaging device. The arthroscope may generate consecutive images (e.g., a video feed) at a rate of at least about 10 frames per second (fps).

In some examples, the image recognition algorithm is trained using a database (e.g., a training dataset). In some examples, the database may comprise a plurality of training images.

The plurality of training images may comprise one or more surgical procedures, surgical tools, surgical tool elements, anatomical structures, or pathologies. In some examples, a training dataset may be generated using an image editing technique. An image editing technique may comprise augmenting an image of a region, a portal, an anatomical structure or an anatomical feature with an image of a surgical tool. The augmented image may then be used to train the image recognition algorithm to recognize the tool within a context of the region, the portal, the anatomical structure or the anatomical feature. In some examples, the image editing, or augmentation techniques may comprise rotating a training image to improve a robustness of the image recognition algorithm against a position or an orientation of a patient, for example, during the arthroscopic surgery. In some examples, the image editing, or augmentation techniques may comprise enlarging or cropping the training images to improve the robustness against changes in a depth of view. In some examples, the image editing, or augmentation techniques may comprise flipping a training image along a vertical axis to improve the robustness against procedures performed on a right or a left side of a patient.

Figure 4:
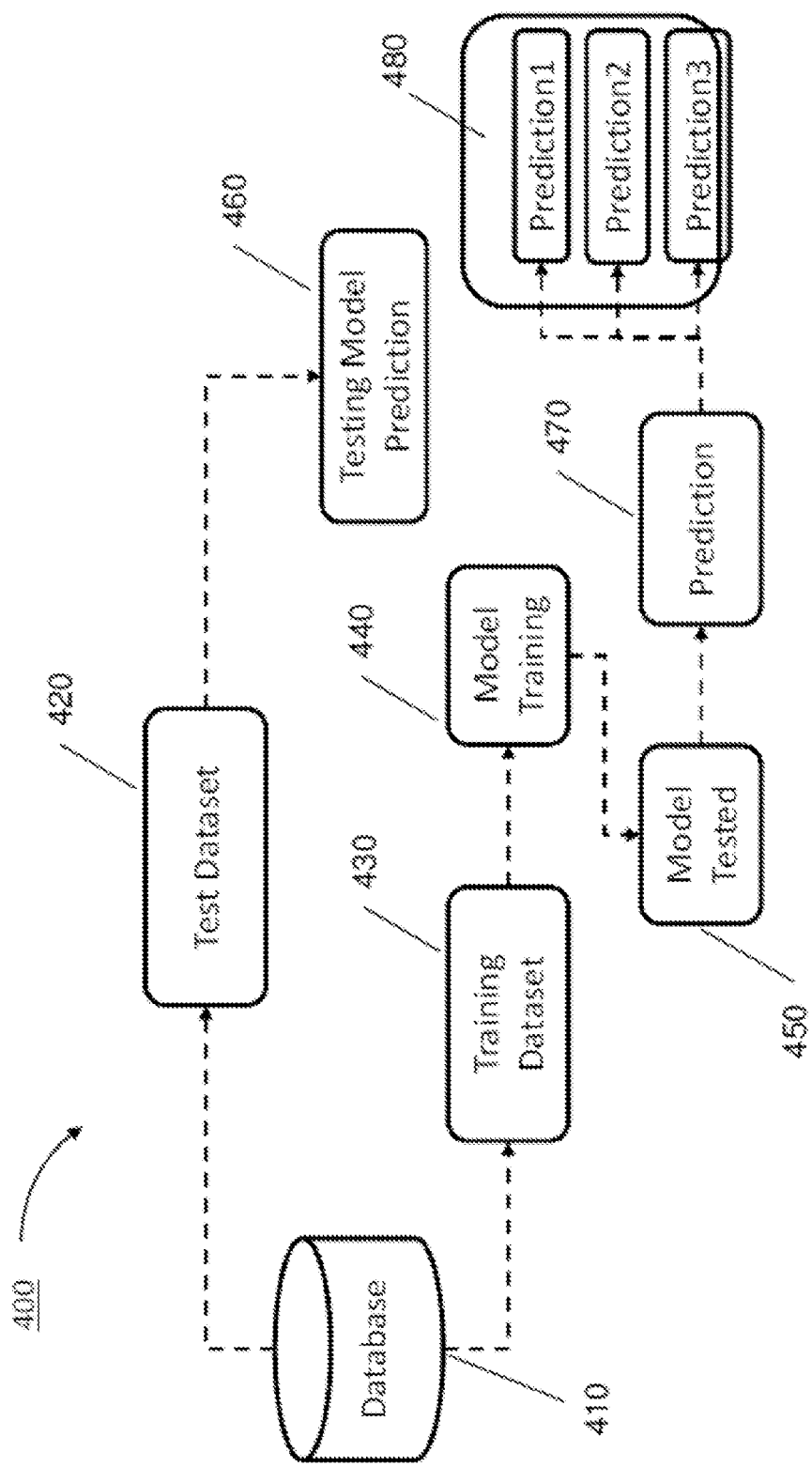
FIG. 4 shows a flowchart of an example for training an image recognition or other algorithm, according to examples of the invention.

FIG. 4 is a flowchart of an example a method of training an image recognition algorithm. An AI training method 400 may comprise a dataset 410. The dataset 410 may comprise an image of a surgical tool, an anatomical structure, an anatomical feature, a surgical tool element, an image acquired from a video feed of an arthroscope, endoscope or other imaging device, a portal of a surgery, a region of a surgery, etc. The dataset may further comprise an image that has been edited or augmented using the methods described hereinbefore. The images in the dataset 410 may be separated into at least a training dataset 430 and a test dataset 420. Training data set 430 includes various images including those for example, of the surgical site or filed, the portal site and/or the surgical tool which are labelled manually for example by medical doctor, nurse, anatomists, medical illustrator or other scientific or medical professional having specialized knowledge of anatomy surgical or other medical procedures. The dataset 410 may be divided into a plurality of test datasets and/or a plurality of training datasets. At a model training step 440, one or both of a training data set or test data set may be used to train an image recognition algorithm. Desirably, the initial training is done in supervised manner. That is a plurality of labeled images part of training dataset 430 are be provided to the image recognition algorithm to train an image recognition algorithm comprising a supervised learning algorithm (e.g., a supervised machine learning algorithm, or a supervised deep learning algorithm).

Unlabeled images may be used to build and train an image recognition algorithm comprising an unsupervised learning algorithm (e.g., an unsupervised machine learning algorithm, or an unsupervised deep learning algorithm). A trained model may be tested using a test dataset 420 (or a validation dataset). A test dataset may comprise unlabeled images (e.g., labeled images where a label is removed for testing a trained model). The trained image recognition algorithm may be applied to the test dataset and the predictions may be compared with actual labels associated with the data (e.g., images) that were removed to generate the test dataset in a testing model predictions step 460. A training step 440 and a testing model predictions step 460 may be repeated with different training datasets and/or test datasets until a predefined outcome is met. In one or more examples, predefined outcome may be an error rate. The error rate may be defined as an accuracy, a specificity, or a sensitivity or a combination thereof. In related examples the error rate may correspond to a bias, variance or a sum of the bias and variance as is known in the AI and machine learning art. The tested model 450 may then be used to make a prediction 470 for labeling features in an image from an imaging device (e.g., an arthroscope) being used in the course of a medical procedure (e.g., arthroscopy). The prediction may comprise a plurality of predictions 480 comprising a region of a surgery, a portal of the surgery, an anatomy, a pathology, a tool, an action being performed, a procedure being performed, etc.

Figure 6:
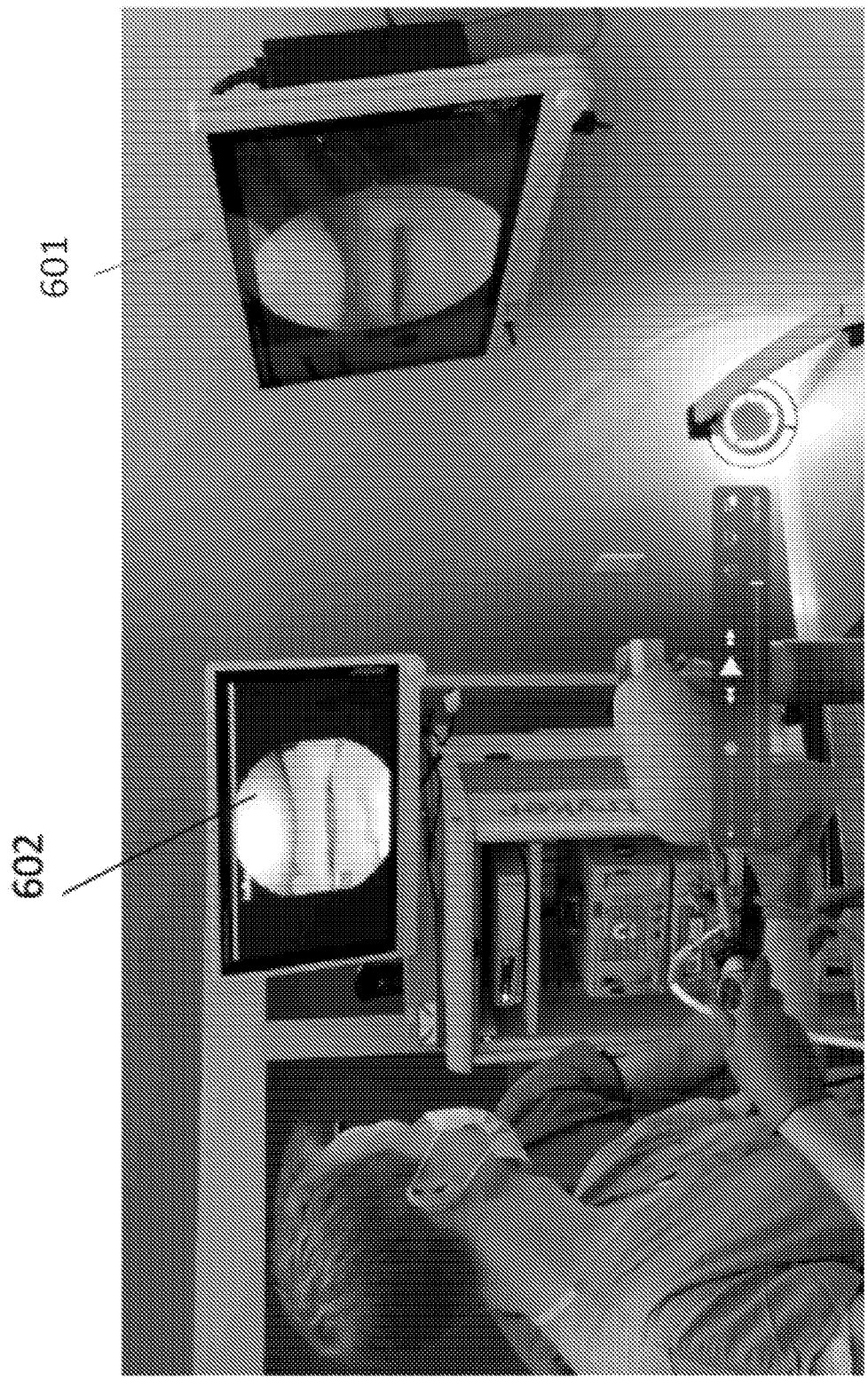
FIG. 6 shows an example of an AI pipeline used in a simulated knee surgery, according to some examples.

FIG. 6 shows an example of an AI pipeline, as described herein, used in a simulated knee surgery as described herein 6. A video feed of the surgery may be provided on a first screen 601. A second screen may provide an AI inference of the surgical field 602 comprising anatomical masks as described hereinbefore. The AI feed may be overlaid on the video feed of the surgery in real-time. The AI feed and the video feed of the surgery may be provided on one screen simultaneously.

Another aspect of the methods and apparatuses as described herein provides a computer-implemented method for guiding an arthroscopic procedure. In some examples, the computer-implemented method may comprise receiving at least one image captured by an interventional imaging device; identifying one or more image features in the received at least one image using an image recognition algorithm; labeling the identified one or more image features, wherein the identified one or more image features; and displaying the labeled one or more image features in the at least one image to an operator continuously in the course of the arthroscopic procedure. The labeled one or more image features may be displayed in real time or concurrent to the arthroscopic procedure. The identified one or more image features may comprise one or more of an anatomical structure, a surgical tool, a surgical tool element, an operational procedure or action, or a pathology.

Another aspect of the methods and apparatuses as described herein provides a method of training an algorithm for guiding an arthroscopic or other surgical or medical procedure. The method of training an algorithm may comprise receiving a set of image features based on one or more images relating to the arthroscopic (or other surgical or medical) procedure; receiving a training dataset, wherein the training dataset comprises one or more labeled images relating to the arthroscopic procedure; recognizing one or more of the image features in images of the training dataset; building an image recognition algorithm based at least partially on the recognition of the one or more image features and the received training dataset. The one or more image features may relate to visual properties of one or more of an anatomical structure, a surgical tool, a surgical tool element, an operational procedure or action, or a pathology. The image recognition algorithm may be configured to identify and label the one or more image features in an unlabeled image relating to the arthroscopic procedure.

The image recognition algorithm may be trained using training data. Training data may comprise images, where subject matter experts trace outlines of various anatomical structures, pathologies, tools, etc. The process of training is similar to the example shown in FIG. 8A-8V, as described elsewhere herein. These subject matter expert labeled images may be also used to train the algorithm to, for example, recognize a given tool performing a given action. A combination of tool recognition, anatomical recognition, and an action recognition may be used to predict a surgical procedure being performed. For example, first an anatomical feature or region (e.g., bursa) may be recognized, which may then trigger other recognition modules to recognize a tool or an action being performed.

Figure 9:
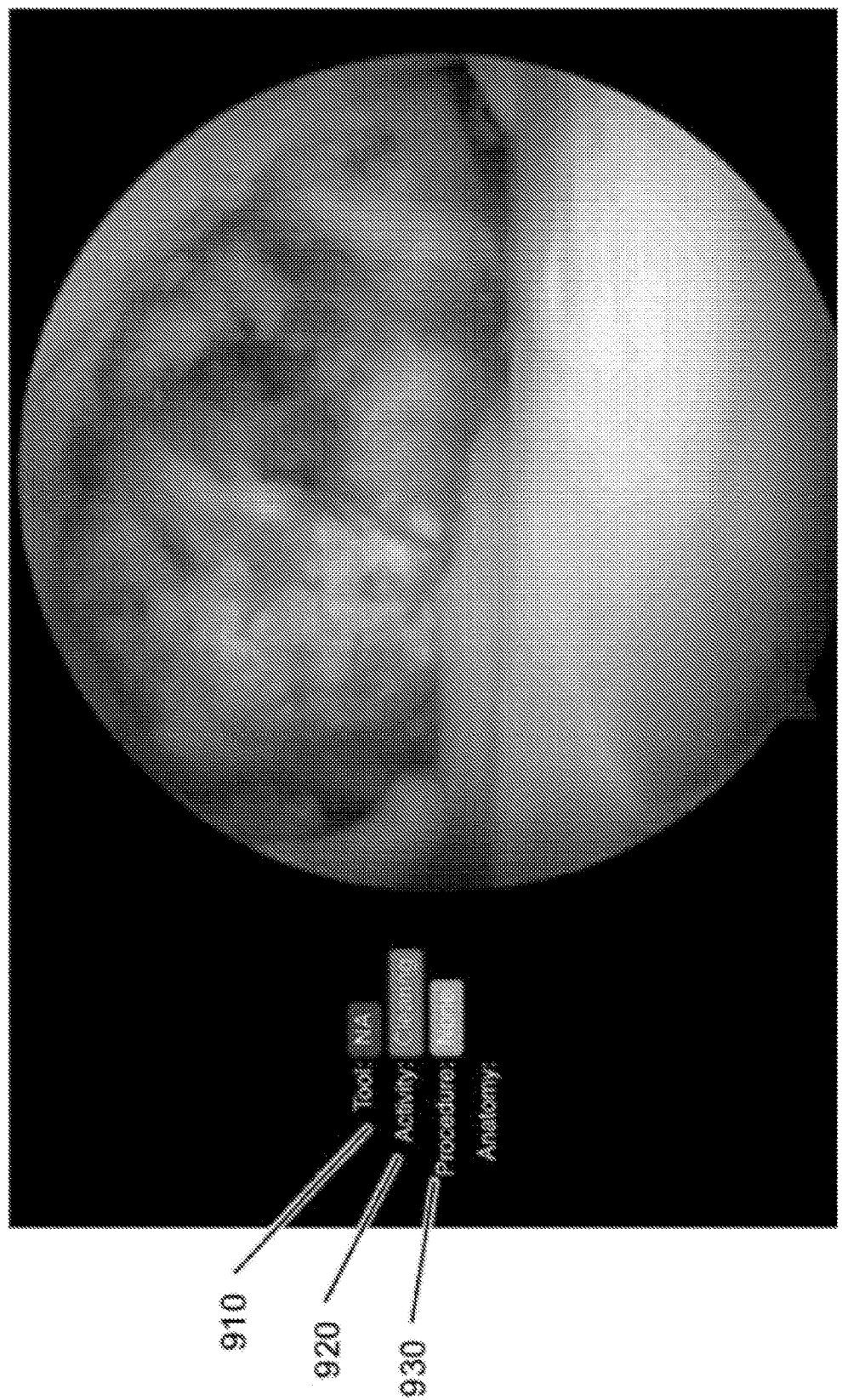
FIG. 9 shows an example of an action recognized by the system for AI-assisted surgery, according to some examples.

In some examples, a tool may not be present in the image. The system may still recognize an activity at least partially based on anatomical features being recognized, a previous image analyzed, or a combination thereof. The previous image processed by the system may have comprised recognizing a tool, an action, a surgical procedure, or combinations thereof. FIG. 9 shows an example of an action (e.g., clearing) identified with a label 920 being recognized by the system, while a tool is not present in the image as shown by a label 910 (showing NA or non-applicability). A surgical procedure identified with a label 930 may not be assigned to an image (FIG. 9). For example, the operator may swap tools during the course of a surgical procedure. In some examples, the swapping of the tools may take several seconds or minutes. In such instances, the system and method described herein, can retain a memory of the recognized tool. In some other examples, the tool may be obscured or not recognizable (e.g., by movement of camera, or orientation of the tool may render it unrecognizable). To compensate for the short term loss of tool recognition, an AI architecture may be used. The AI architecture may comprise a neural network architecture. The neural network architecture may comprise a long short term memory (LSTM).

Figure 10:
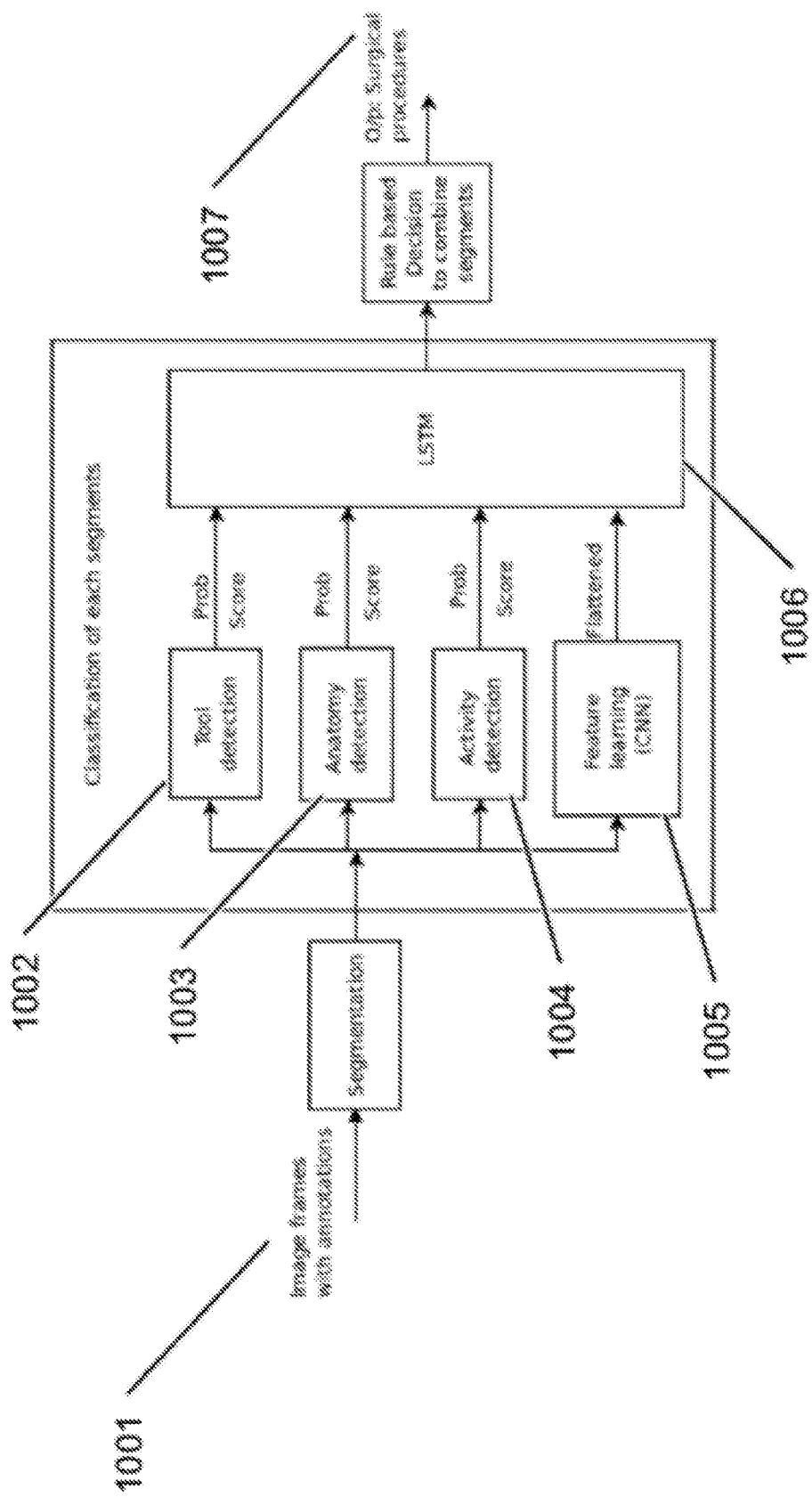
FIG. 10 shows an example flowchart of the process of identifying a surgical procedure, according to some examples.

Techniques and methods for identifying a surgical procedure are described herein and illustrated below. In some examples, image frames with annotations may be received and segmented into one or more segments using one or more classifier models. For example, FIG. 10 shows an example flowchart of the process of identifying a surgical procedure, as described herein. Image frames with annotations 1001 may be received and segmented into one or more segments using one or more classifier models. The classifier models may comprise a tool recognition model 1002, an anatomy detection model 1003, an activity detection model 1004, or a feature learning model 1005. The outputs from the one or more classifiers may be combined using a long short term memory (LSTM) 1006. LSTM is an artificial recurrent neural network (RNN) classifier that may be used to predict based on image recognition at one moment compared to what has been recognized prior. In other words, LSTM may be used to generate a memory of a context of the images being processed, as described herein. The context of the images is then used to predict a stage of the surgery comprising a surgical procedure. A rule based decision to combine the classified segments into one image may then be processed to identify and/or predict a surgical procedure 1007 being performed.

Also described herein are systems for implementing a hierarchical pipeline for guiding an arthroscopic surgery. The system may comprise one or more computer processors and one or more non-transitory computer-readable storage media storing instructions that are operable, when executed by the one or more computer processors, to cause the one or more computer processors to perform operations. The operations may comprise (a) receiving at least one image captured by an interventional imaging device; (b) identify one or more image features of a region of treatment or a portal of entry in the region based on at least one upstream module; (c)) activating a first downstream module to identify one or more image features of an anatomical structure, or a pathology based at least partially on the identified one or more image features in step (b); (d) activating a second downstream module to identify one or more image features of a surgical tool, a surgical tool element, an operational procedure or action relating to the arthroscopic surgery based at least partially on the identified one or more image features in step (b); (e) labeling the identified one or more image features; and displaying the labeled one or more image features in the at least one image continuously to an operator in the course of the arthroscopic surgery. The at least one upstream module may comprise a first trained image processing algorithm. The downstream module may comprise a second trained image processing algorithm. The second downstream module may comprise a third trained image processing algorithm.

In some examples, surgical stage recognition may include detecting the stage or the surgical sub-procedure. This may be of significant value to the hospitals and surgery centers. Signals about the stage of the current surgery in the operation room (OR) may help the administrators manage the surgical workflow—preparing patients waiting to enter surgery, ensuring that the recovery rooms are available etc.

In some examples the system may work by processing a stream of video frames from an endoscopic imaging system. The system may apply online hierarchical clustering algorithms on the incoming frames and clusters the frames. For example, two variations of the online techniques could be used with the stage recognition system, including online top-down algorithms or online hierarchical clustering. In an Online-Top-Down algorithm the algorithm performs a search from the root towards the leaves of the tree and inserting the image into an existing cluster or creating a leaf/branch if the incoming image is sufficiently distant from existing clusters. The OTD algorithm may, given a new query point in an existing tree, compare the average similarity of the point to the current tree against the average similarly of points in the current tree. If the average similarity of the new point is higher than the average similarity to the point in the current tree, the new point may be added as a sibling to the tree, otherwise a subtree may be identified in which the new point is more similar. In one example, a hierarchical clustering algorithm in which the portions of the hierarchy are merged and rebuilt for each incoming frame may be used. The 'distance' between the elements may be computed in the multi-dimensional space containing the data. In particular, the methods and apparatuses described herein may use a novel distance measure, specifically designed for surgical images, in these implementations (e.g., in any of the methods and apparatuses including identifying a surgical procedure as part of the method and apparatus).

Distance Measure

The distance measure may operate on coordinates in a 4096 (arbitrarily set) space. Each input frame is fed to a neural network. The last layer of the network may be removed and the inputs to the last layer may be captured into a vector. These features, called FC7 features, may contain information about the input frame at varying levels of abstraction. For example, the novel distance measure described herein may use a deep neural network—UNet—which has been trained to recognize anatomical structures in arthroscopic procedures. In this manner, the FC7 features are highly specialized and reflect the images in a surgery.

Clusters

The clusters created in this manner may contain images which have similar characteristics. By combining temporal information into the clustering techniques as an additional dimension, the clusters are made to reflect sequences of frames which display similar anatomical structures, and which are temporally connected. When clusters from neighboring branches of the hierarchical tree are considered together, they represent slow changes in the surgical field of view.

Surgery Stage Recognition

Up until this point, no semantics are attached to the clusters. The novel distance measure may again be used to determine to which surgery stage a newly formed cluster belongs. This cluster being populated in time represents a distinct stage in the surgery based on the image and temporal proximity with their neighboring frames. As the hierarchical cluster is being constructed, the system may test the centroids of the clusters below the non-leaf nodes against a reference catalog of images. The reference catalog of images contains representative images from various stages in a given surgical procedure. Each of these reference images may also contain a clinically significant tag/label describing the stage of the surgery. When the system detects a matching reference image for a cluster that is being newly formed, it outputs the label corresponding to the reference image as the surgery stage.

Another aspect of the methods and apparatuses as described herein provides a system for implementing a hierarchical pipeline for guiding an arthroscopic surgery. The system may comprise one or more computer processors and one or more non-transitory computer-readable storage media storing instructions that are operable, when executed by the one or more computer processors, to cause the one or more computer processors to perform operations. The operations may comprise (a) receiving at least one image captured by an interventional imaging device; (b) identify one or more image features of a region of treatment or a portal of entry in the region based on at least one upstream module; (c)) activating a first downstream module to identify one or more image features of an anatomical structure, or a pathology based at least partially on the identified one or more image features in step (b); (d) activating a second downstream module to identify one or more image features of a surgical tool, a surgical tool element, an operational procedure or action relating to the arthroscopic surgery based at least partially on the identified one or more image features in step (b); (e) labeling the identified one or more image features; and displaying the labeled one or more image features in the at least one image continuously to an operator in the course of the arthroscopic surgery. The at least one upstream module may comprise a first trained image processing algorithm. The downstream module may comprise a second trained image processing algorithm The second downstream module may comprise a third trained image processing algorithm.

Figure 11A:
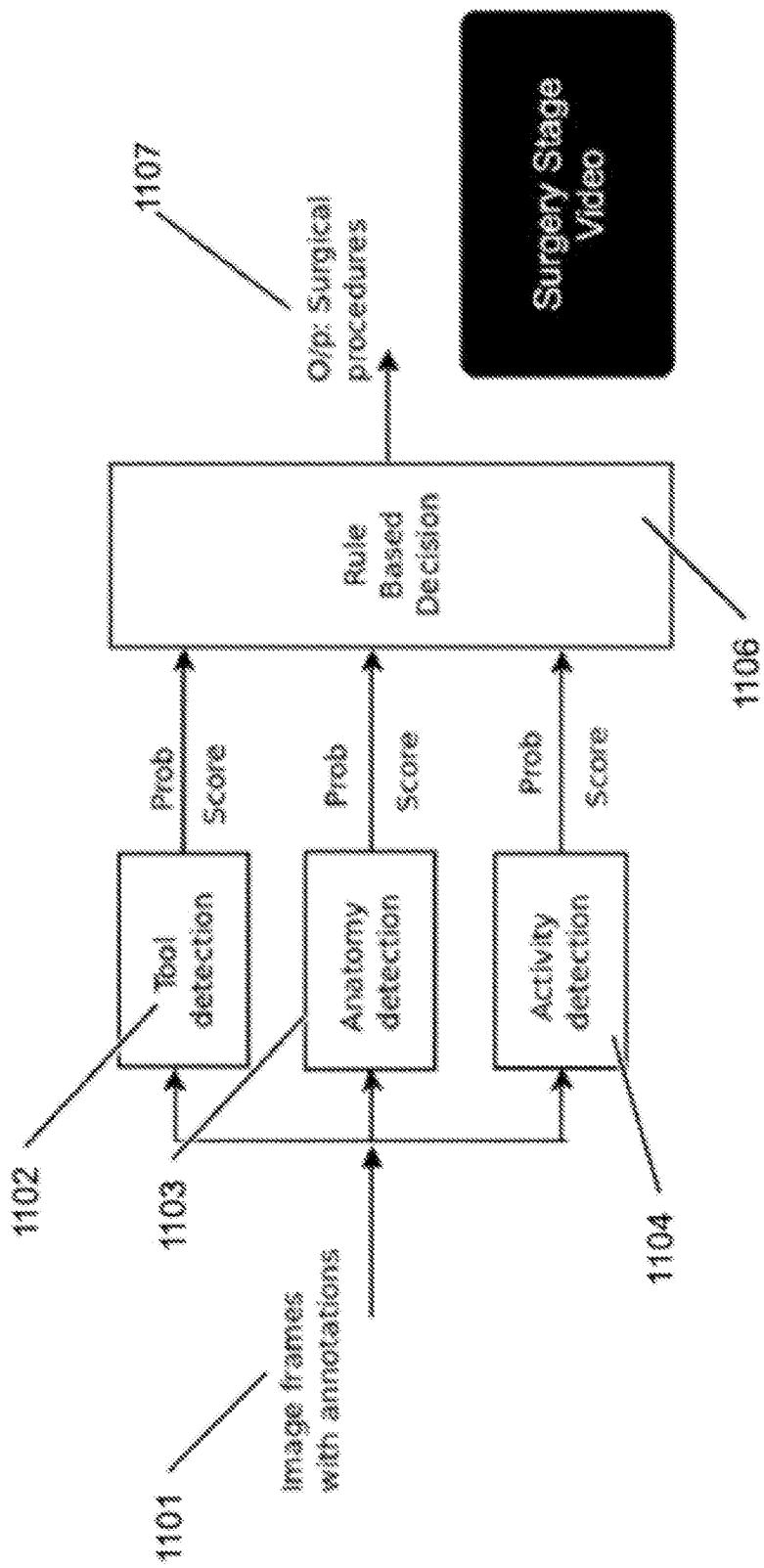
FIG. 11A shows another example of the process of identifying a surgical procedure, according to some examples.

FIG. 11A shows another example of the process of identifying a surgical procedure, as described herein. Image frames with annotations 1101 may be received and segmented into one or more segments using one or more classifier models. The classifier models may comprise a tool recognition model 1102, an anatomy detection model 1103, and/or an activity detection model 1104. The outputs from the one or more classifiers may be processed and combined using a rule-based decision algorithm 1106. In one or more examples, a predicted surgical procedure 1107, may be provided as a label overlaid on the surgical video stream.

Figure 11B:
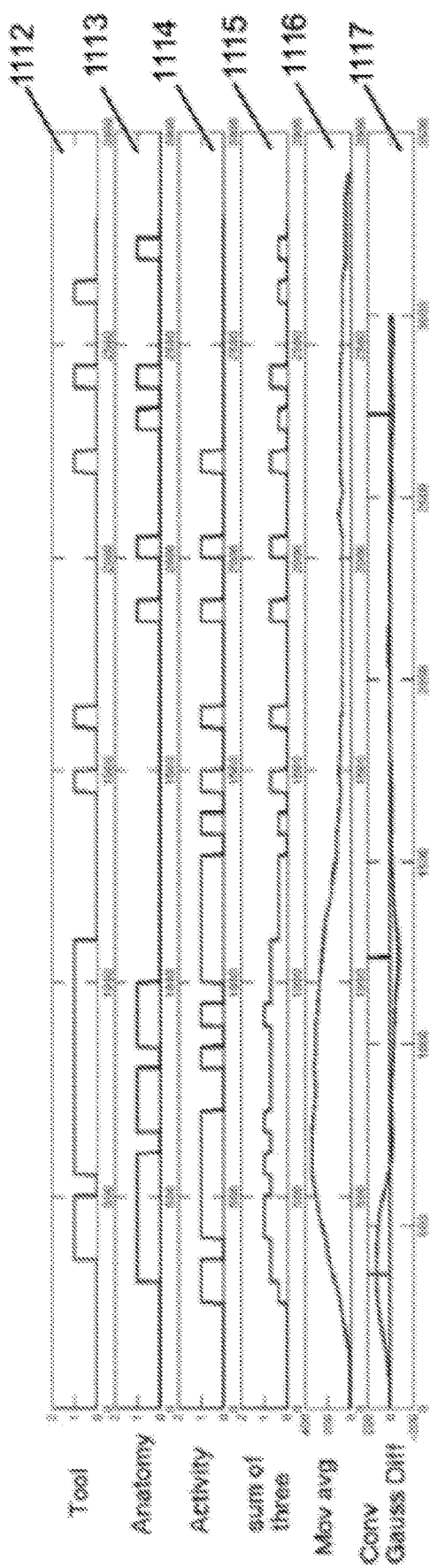
FIG. 11B shows an example of an output from tool detection, anatomy detection, and activity detection models across time, according to some examples.

FIG. 11B shows an example of an output from each of the components across time (e.g., duration of a procedure), described herein. The output shown in FIG. 11B may comprise a movement of the recognized tool, anatomy, and/or a change in the activity. The movement of a tool may be due to the movement of the camera or a change on the procedure, where a tool is swapped. The movement in the anatomy may be due the structural changes in the anatomy due, for example, to the procedure or due to the movement of the camera. In some examples, the operator may pause or change an activity during the procedure and resume the action after the pause. An example of an output from the tool recognition model 1102 (e.g., a movement of a recognized tool) is shown in graph 1112; an example of an output from the anatomy detection model 1103 (e.g., a movement of a recognized anatomy) is shown in graph 1113; and an example of an output from the activity detection model 1104 (e.g., a pause or change in the activity or the surgical procedure) is shown in graph 1114. To generate a seamless labeling of the predicted procedure, the outputs from the tool recognition model 1102, the anatomy detection model 1103, and/or the activity detection model 1104 are combined (e.g., summed) as shown in graph 1115. In some examples, the sum of the outputs is averaged over time to generate an averaged sum as shown in graph 1116. In some examples, the average sum is processed using a smoothing algorithm to generate a smooth average sum. The smoothing algorithm may comprise a gaussian smoothing function. The smoothing algorithm may comprise a convolutional neural network (e.g., convolutional neural network) with its activity shown in graph 1117.

Figure 12:
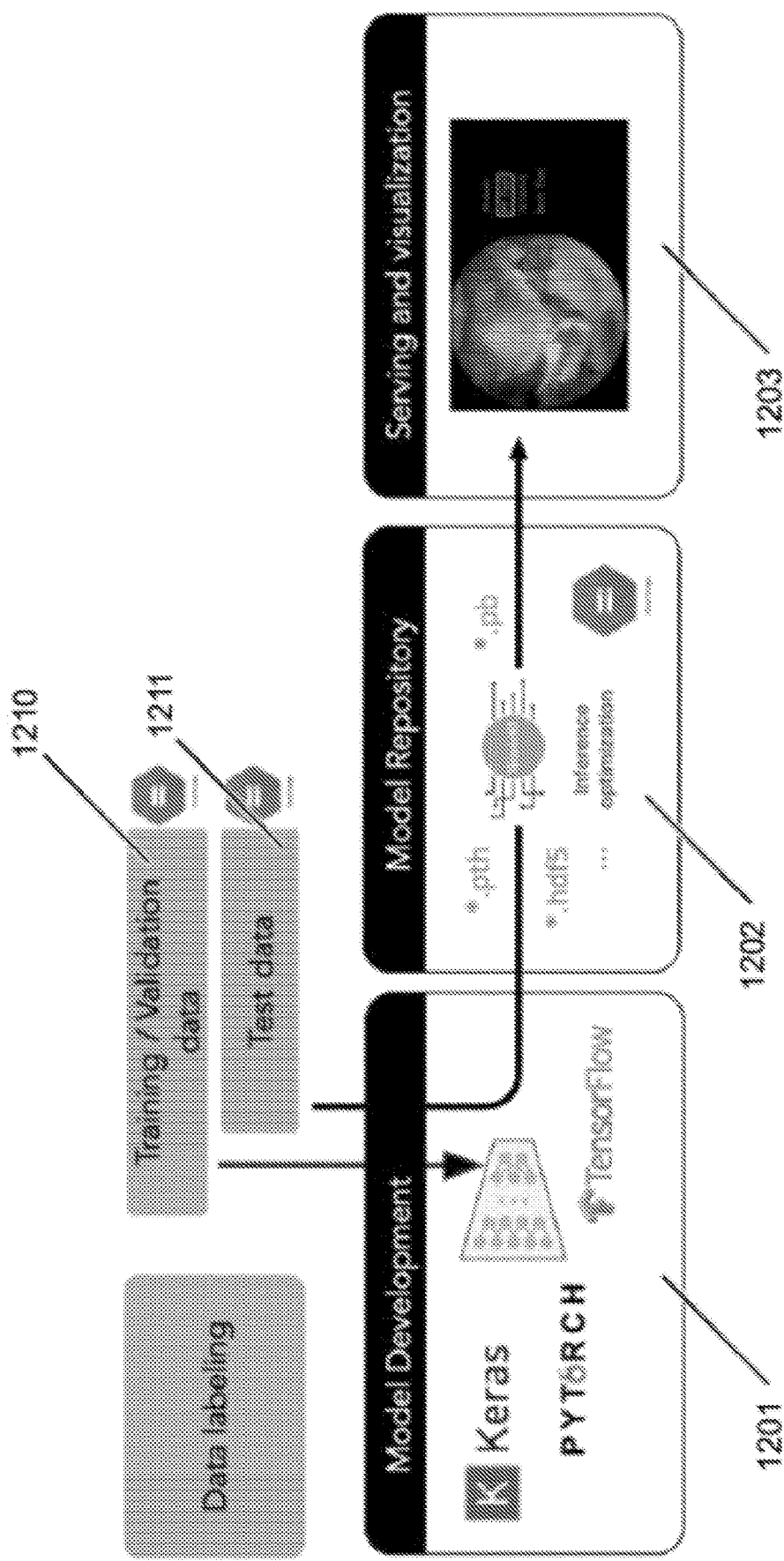
FIG. 12 shows a schematic diagram of elements in an AI assisted surgery system, according to some examples.
Figure 13:
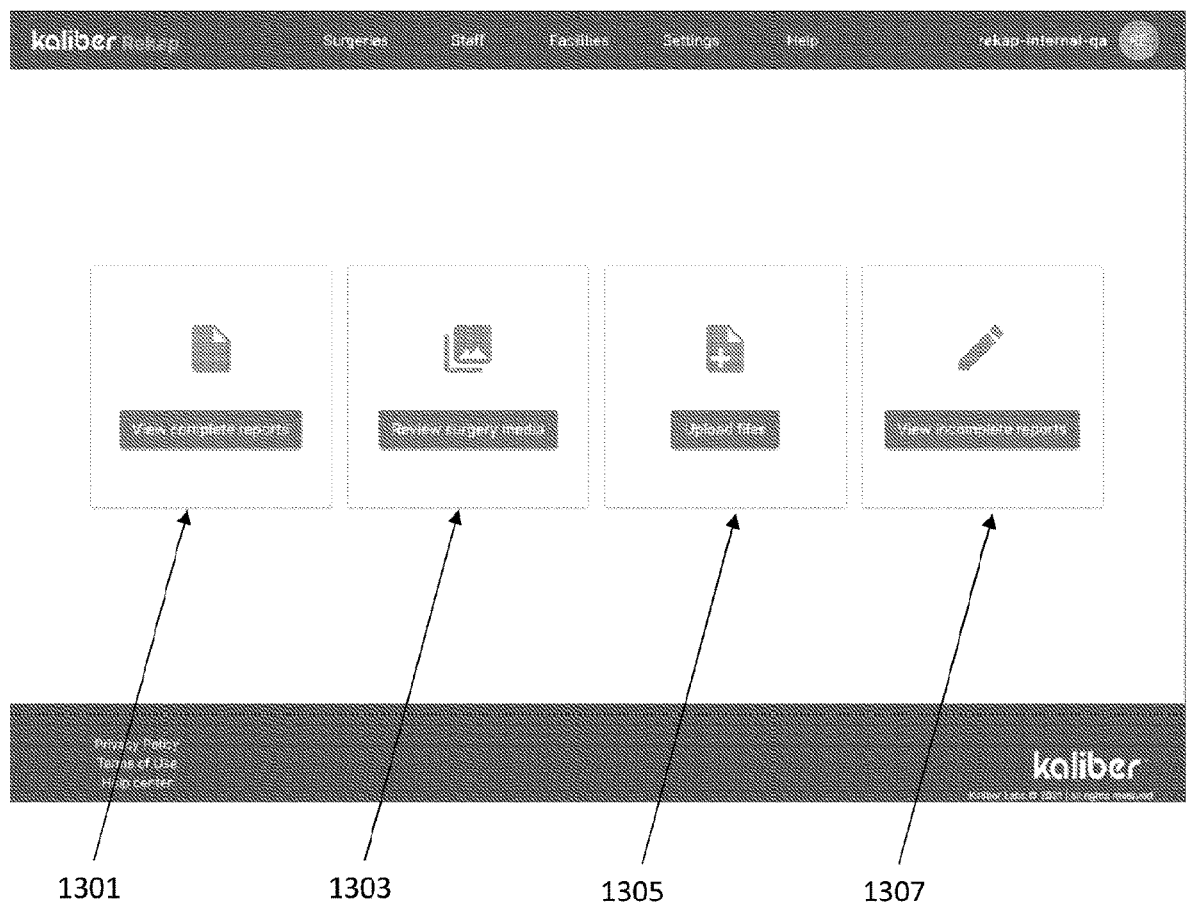
FIG. 13 shows one example of a user interface that may be included as part of the AI assisted surgery systems and methods described herein.

FIG. 12 shows a schematic diagram of exemplary elements in AI assisted surgery methods and systems, described herein. The systems and methods may comprise elements comprising model development 1201, model repository 1202, and providing (e.g., visualizing) a label or mask 1203. Developing AI/machine learning models or algorithms used to process a surgical image may comprise training and/or validation steps 1210. Test data 1211 may be used to train and validate AI/machine learning models. A feature identified/recognized in an image obtained from a surgery (e.g., a frame of a surgical video) may be visualized (e.g., a mask, or a label) overlaid 1203 on a video or image of the surgical field of view.

Output—User Interface

In any of the apparatuses and methods described herein, a report may be generated for the patient, the clinician, or a third party medical care provider (e.g., physical therapist, etc.). For example a user interface (e.g., "dashboard") may be provided. FIGS. 13-17 illustrate examples of user interface screens that may be generated as part of this interactive report. For example in FIG. 13, the dashboard user interface screen may allow a user (e.g., surgeon, clinician, nurse, other medical caregiver) to view a complete report 1301, the surgery media 1303, uploaded filed 1305 (e.g., images, movies, etc.) and/or view incomplete reports 1307.

Figure 14:
FIGS. 14, and 15A-15B illustrate examples of a portion of a user-specific report ("dashboard") that may be generated by the methods and apparatuses described herein.

In some cases the report may be a patient report, and the user interface may be configured to show patient information that is configured for view specifically by the patient. The user interface may include controls (user controls) and may provide explanations to the patient, as shown in the example of FIG. 14.

In general, the user interface for the patient may include labels and/or annotations may be automatically selected using an AI and could include one or more of diagnostic, treatment or post-treatment. The core technology used for this may come from the surgical activity recognition techniques discussed above. Thus, the system may automatically annotate the surgical images for presentation as part of the dashboard/user interface for the patient. Specifically, the system may (e.g., using the surgical activity recognition technique) identify the surgical procedure performed, and may automatically annotate the figures and populate the report with data specific or generic to the identified surgical activity. One or more databases may be used to provide the data specific or generic to the identified surgery. In some cases a physician specific database may be used instead of (or in addition to) a general database.

Figure 15A:
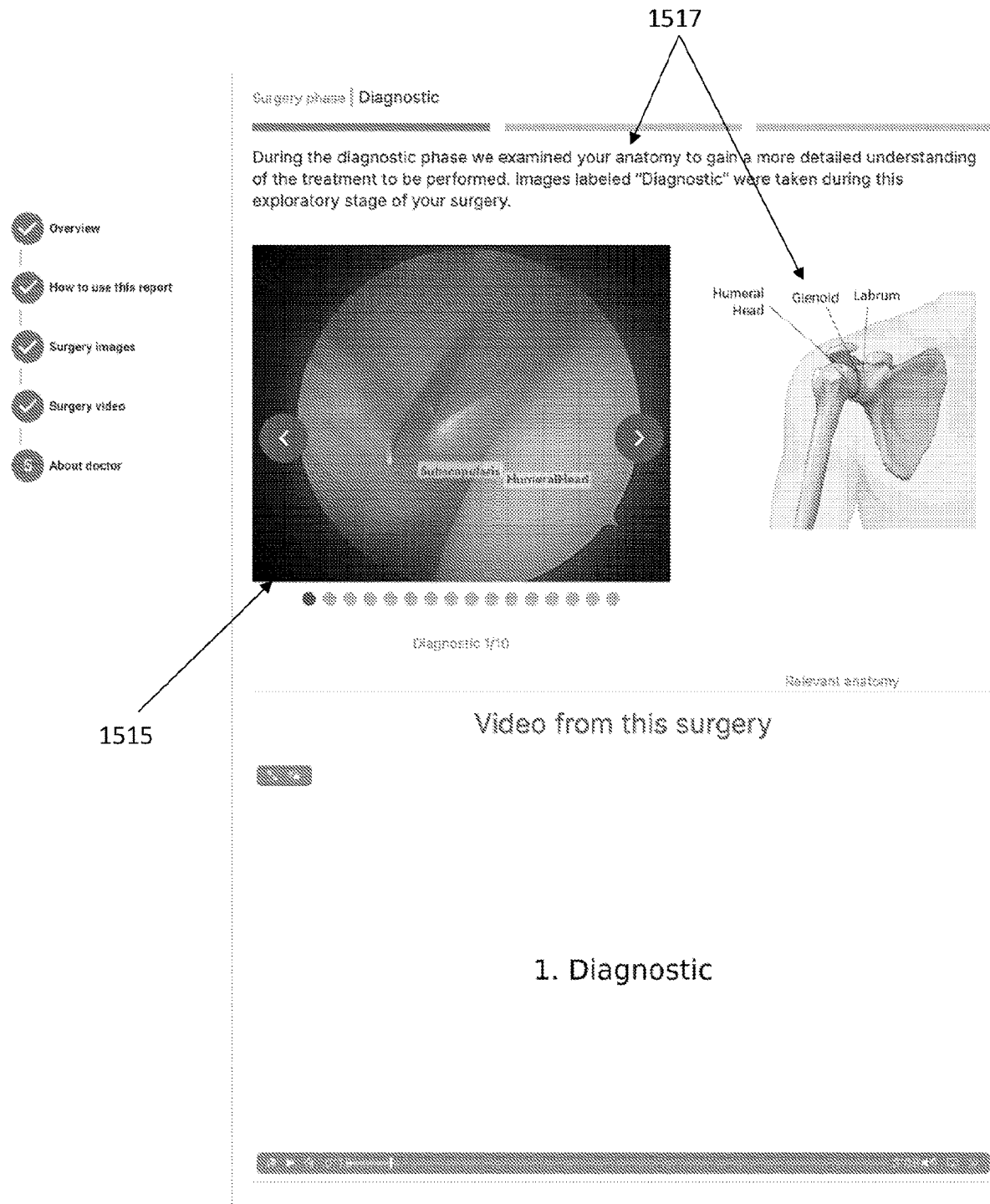
Figure 15B:
Figure 16:
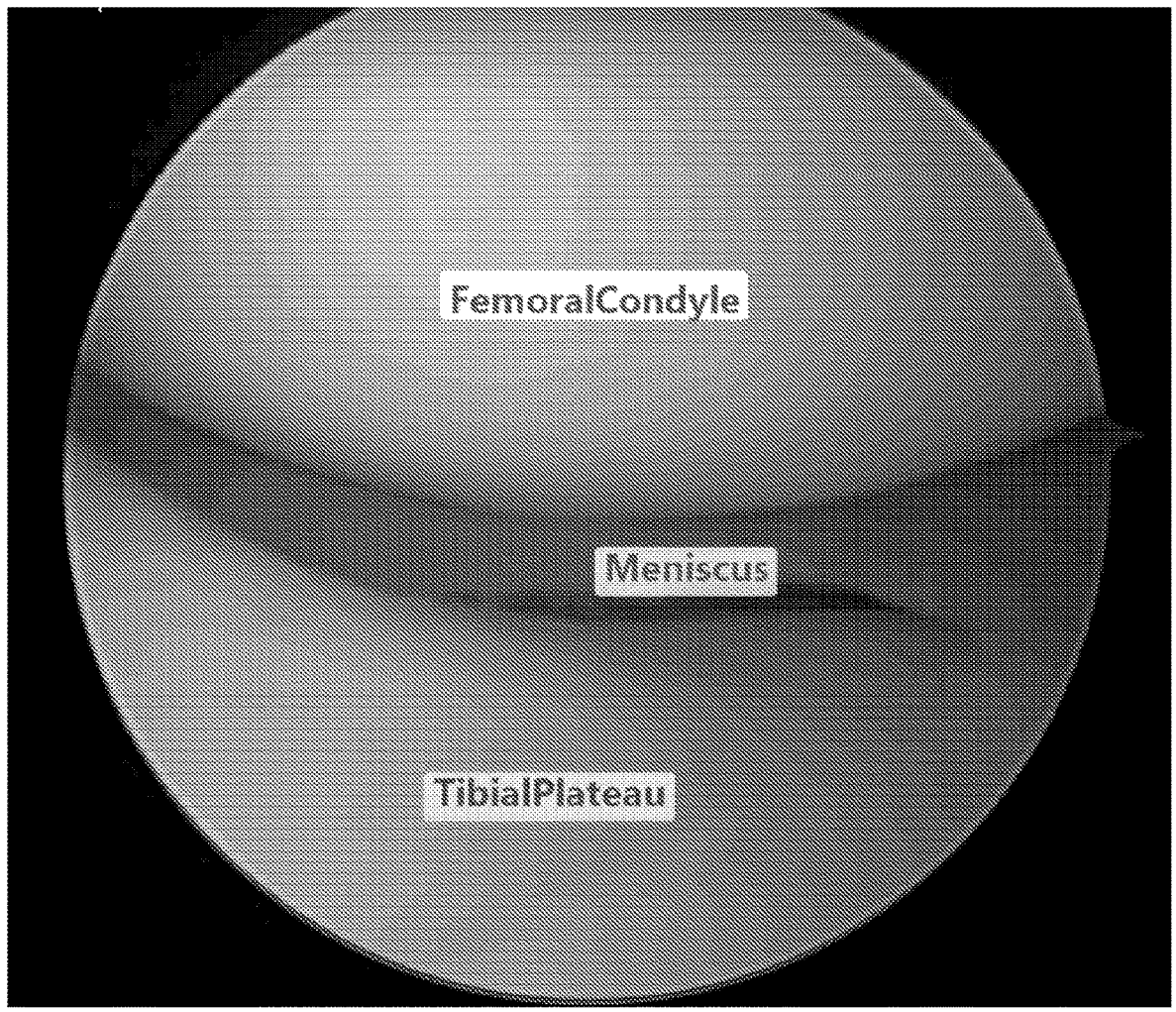
FIG. 16 is an example of an image from a procedure that has been annotated as described herein.

For example, FIG. 15A illustrates one example of a user interface (report) generated by the techniques described herein from the images of the procedure. The system may therefore customize and annotate the images and may provide contextual information as shown. In FIGS. 15A-15B the patient specific image 1515 is shown, including annotates, and corresponding and contextually relevant information 1517 is provided alongside of the patient-specific images. Still images and movies/video (both annotated as described herein) may be provided. FIG. 16 shows one example of a more detailed annotated patient-specific image, as described above.

Computer Systems

Figure 5:
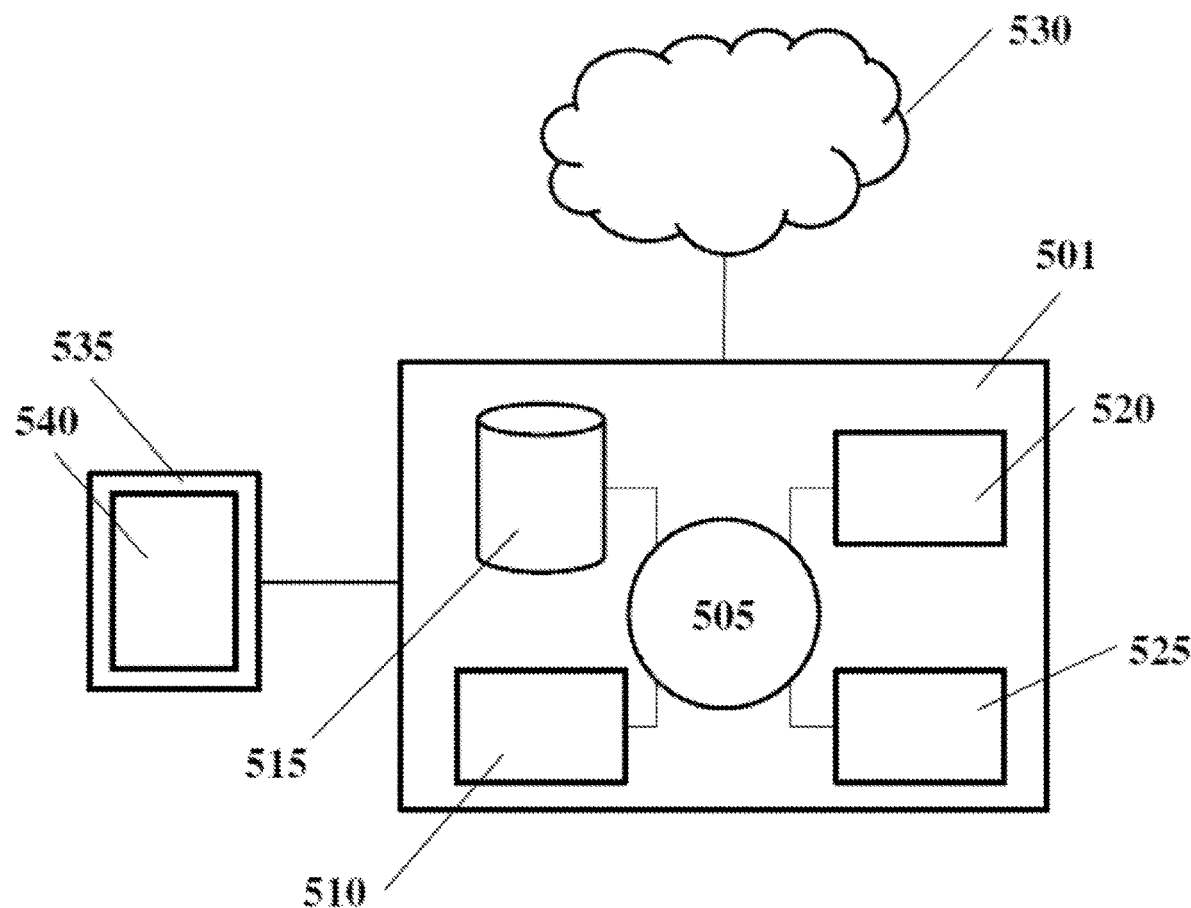
FIG. 5 shows an example of a computer system that is programmable or otherwise configured to implement various examples of methods as described herein.

Various example of the methods and apparatuses as described herein provides computer systems that are programmed to implement methods of the methods and apparatuses as described herein. FIG. 5 shows an example of a computer system 501 that is programmed or otherwise configured to perform one or more functions or operations of examples of methods of the methods and apparatuses as described herein. In various examples computer system 501 can correspond to computer 10 and one or more aspects of system 1 described above. In various examples, computer system 501 can regulate and/control various aspects of the methods and apparatuses as described herein, such as, for example, of receiving an image from an interventional imaging device, identifying features in the image using an image recognition algorithm, overlaying the features on a video feed on a display device, make recommendations or suggestion to an operator based on the identified features in the image. Also in various examples computer system 501 can be an electronic device of a user such as tablet or smart phone or a computer system that is remotely located with respect to the electronic device. The electronic device can be a mobile electronic device.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some examples is a telecommunication and/or data network. The network 530 can include one or more computer servers, which can enable distributed computing, such as cloud computing. The network 530, in some examples with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the methods and apparatuses as described herein. Examples of operations performed by the CPU 505 can include fetch, decode, execute, and writeback. The CPU 505 can be part of a circuit, such as an integrated circuit. One or more other components of the system 501 can be included in the circuit. In some examples, the circuit is an application specific integrated circuit (ASIC).

The storage unit 515 can store files, such as drivers, libraries and saved programs. The storage unit 515 can store user data, e.g., user preferences and user programs. The computer system 501 in some examples can include one or more additional data storage units that are external to the computer system 501, such as located on a remote server that is in communication with the computer system 501 through an intranet or the Internet.

The computer system 501 can communicate with one or more remote computer systems through the network 530. For instance, the computer system 501 can communicate with a remote computer system of a user (e.g., a portable computer, a tablet, a smart display device, a smart tv, etc.). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some examples, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine having a processer adapted to execute the code or can be compiled during runtime. The code can be supplied in a programming language that can be selected to enable the code to execute in a pre-compiled or as-compiled fashion.

Aspects of the systems and methods provided herein, such as the computer system 501, can be embodied in programming which may correspond to software or firmware. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface (UI) 540 for providing, for example, an overlay of the identified features on a video feed from an arthroscope or to provide a recommendation to an operator in the course of a surgery. Examples of UI's include, without limitation, a graphical user interface (GUI) and web-based user interface.

Methods and systems as described herein can be implemented by way of one or more algorithms. An algorithm can be implemented by way of software upon execution by the central processing unit 505. The algorithm can, for example, receiving an image from an interventional imaging device, identifying a feature in the image using an image recognition algorithm, overlaying the features on a video feed on a display device, make recommendations or suggestion to an operator based on the identified feature in the image.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits described herein.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like. For example, any of the methods described herein may be performed, at least in part, by an apparatus including one or more processors having a memory storing a non-transitory computer-readable storage medium storing a set of instructions for the processes(s) of the method.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for creating an annotated visual summary of a minimally invasive medical procedure performed on a patient, the method being performed on one or more processors and comprising:
    extracting feature points from a single still image of the medical procedure and each frame of a sequential group of frames from a video of the medical procedure using a first machine learning algorithm, the still image and the video generated by or derived from an imaging device introduced into an interior of the patient during the procedure;
    comparing the feature points of the still image to the feature points of each frame of the group of frames from the video so as to determine a match between the still image and a given frame from the video and a sequence location in the video where the matched still image occurred, the comparison being done using a second machine learning algorithm, wherein a sequence number of a particular still image is used to reduce a size of the group of frames from which image features are extracted or compared to the still image;
    copying a portion of the video containing the matched single image so as to create a video clip, the video clip having a selected duration before and/or after a sequential location of the still image in the video;
    analyzing a plurality of frames in the video clip so as to identify image features in the video clip, wherein a fidelity of identification of a particular image feature is substantially unaffected when the image feature is non localizable or at least partially obscured, the analysis performed using a third machine learning algorithm; and
    annotating at least one of the still image or the video clip with information from the medical procedure, the information including or being derived from the at least one image feature.

2. The method of claim 1, wherein the feature points comprise visual attributes and secondary attributes derived from these visual attributes.

3. The method of claim 2, wherein the visual attributes comprise at least one of a ridges or texture.

4. The method of claim 2, wherein the secondary attributes comprise gradients in texture.

5. The method of claim 1, wherein the annotation is done using a machine learning algorithm.

6. The method of claim 1, wherein the annotation comprises labelling the at least one image feature in the still image or the video clip.

7. The method of claim 6, wherein the least one image feature comprises at least one of an anatomical structure, a pathology or defect of the anatomical structure or a repair to the pathology or defect of the anatomical structure.

8. The method of claim 6, wherein labelling comprises placing a label on a centroid of ab anatomical structure in the still image or a frame in the video clip, when the anatomical structure is of at least a predetermined size.

9. The method of claim 8, further comprising: detecting movement, of the anatomical structures from frame to frame in the video clip by determining a sameness of a given structure through deformations and occlusions, with the sameness determined by means of an anatomy-aware feature tracking algorithm; detecting a displacement of a label of an anatomical structure from frame to frame in the video clip; and adjusting the displacement of the anatomical structure label to move incrementally between positions, thereby reducing the perceived jitter in the labels.

10. The method of claim 9, wherein an adjustment in the displacement of the anatomical structure label is made using a motion smoothing filter.

11. The method of claim 10, wherein motion smooth filter comprises a Kalman filtering algorithm.

12. The method of claim 1, wherein the minimally invasive medical procedure is an orthopedic procedure, a GI procedure, a cardiovascular procedure, urological procedure or a gynecological procedure.

13. The method of claim 12, wherein the orthopedic procedure is a shoulder procedure or a knee procedure.

14. The method of claim 1, wherein the imaging device is an arthroscope, endoscope, laparoscope or cardioscope.

15. The method of claim 1, further comprising: signaling over one of a wireless network, a wired network connection, or a wired streaming media connection at least one of the annotated still image or video clip to a processor-based device.

16. The method of claim 15, wherein the processor-based device comprises a portable device or a cell phone.

17. The method of claim 15, wherein the wired streaming media connection comprises a HDMI or DisplayPort.

18. The method of claim 1, wherein at least one of the first, second or third machine learning algorithms comprises a hierarchical arrangement of processing modules.

19. The method of claim 18, wherein the processing modules comprise a plurality of Artificial Intelligence (AI) modules.

20. The method of claim 19, wherein the processing modules comprise at least one dataset.

21. The method of claim 20, wherein the dataset comprises at least one training dataset.

22. The method of claim 19, wherein said processing modules comprise an upstream module and a downstream module, wherein the downstream module being more specialized than the upstream module.

23. The method of claim 22, wherein the upstream module is configured to identify an anatomy or anatomical site being operated upon by an operational procedure or an action being performed during the minimally invasive procedure.

24. The method of claim 22, wherein the downstream module is configured to recognize an anatomical feature of the identified anatomical site or recognize a treatment tool feature associated with said operational procedure or said action being performed.

25. A system comprising:
one or more processors;
a memory coupled to the one or more processors, the memory storing computer-program instructions, that, when executed by the one or more processors, perform a computer-implemented method comprising:
extracting feature points from a single still image of the medical procedure and each frame of a sequential group of frames from a video of the medical procedure using a first machine learning algorithm, the still image and the video generated by or derived from an imaging device introduced into an interior of the patient during the procedure;
comparing the feature points of the still image to the feature points of each frame of the group of frames from the video so as to determine a match between the still image and a given frame from the video and a sequence location in the video where the matched still image occurred, the comparison being done using a second machine learning algorithm, wherein a sequence number of a particular still image is used to reduce a size of the group of frames from which image features are extracted or compared to the still image;
copying a portion of the video containing the matched single image so as to create a video clip, the video clip having a selected duration before and/or after a sequential location of the still image in the video;
analyzing a plurality of frames in the video clip so as to identify image features in the video clip, wherein a fidelity of identification of a particular image feature is substantially unaffected when the image feature is non localizable or at least partially obscured, the analysis performed using a third machine learning algorithm; and
annotating at least one of the still image or the video clip with information from the medical procedure, the information including or being derived from the at least one image feature.

26. A non-transitory computer-readable medium including contents that are configured to cause one or more processors to perform a method comprising:
extracting feature points from a single still image of the medical procedure and each frame of a sequential group of frames from a video of the medical procedure using a first machine learning algorithm, the still image and the video generated by or derived from an imaging device introduced into an interior of the patient during the procedure;
comparing the feature points of the still image to the feature points of each frame of the group of frames from the video so as to determine a match between the still image and a given frame from the video and a sequence location in the video where the matched still image occurred, the comparison being done using a second machine learning algorithm, wherein a sequence number of a particular still image is used to reduce a size of the group of frames from which image features are extracted or compared to the still image;
copying a portion of the video containing the matched single image so as to create a video clip, the video clip having a selected duration before and/or after a sequential location of the still image in the video;
analyzing a plurality of frames in the video clip so as to identify image features in the video clip, wherein a fidelity of identification of a particular image feature is substantially unaffected when the image feature is non localizable or at least partially obscured, the analysis performed using a third machine learning algorithm; and
annotating at least one of the still image or the video clip with information from the medical procedure, the information including or being derived from the at least one image feature.

\* \* \* \* \*